US006520634B2

(12) United States Patent
Yoshinaga et al.

(10) Patent No.: US 6,520,634 B2
(45) Date of Patent: Feb. 18, 2003

(54) IMAGE FORMING APPARATUS WITH HEAT TREATING OF RECORDING MATERIAL

(75) Inventors: Kenji Yoshinaga, Tokyo (JP); Kazuhiko Onuki, Tokyo (JP)

(73) Assignee: Canon Kabushiki Kaisha, Tokyo (JP)

(*) Notice: Subject to any disclaimer, the term of this patent is extended or adjusted under 35 U.S.C. 154(b) by 0 days.

(21) Appl. No.: 09/764,372

(22) Filed: Jan. 19, 2001

(65) Prior Publication Data

US 2001/0046397 A1 Nov. 29, 2001

(30) Foreign Application Priority Data

Jan. 21, 2000 (JP) ....................................... 2000-013345
Jun. 2, 2000 (JP) ....................................... 2000-165474

(51) Int. Cl.[7] .................................................. G01D 9/00
(52) U.S. Cl. .......................... 347/102; 347/104; 346/25
(58) Field of Search ................................ 347/218, 153, 347/139, 262, 264, 104, 102; 399/400, 405, 406, 407, 341, 342, 45; 271/302, 303; 346/76.1, 25; 101/487, 488

(56) References Cited

U.S. PATENT DOCUMENTS 4,733,281 A 3/1988 Yoshinaga et al.
5,153,662 A * 10/1992 Foos .......................... 162/271
5,201,517 A * 4/1993 Stemmle .................. 270/58.07
5,222,730 A * 6/1993 Miyake ....................... 271/296
5,323,176 A * 6/1994 Sugiura et al. ............. 346/134
5,381,209 A * 1/1995 Binder et al. ................. 355/27
6,135,591 A * 10/2000 Ikeda et al. ................. 271/184
6,186,501 B1 * 2/2001 St. Ours ..................... 271/200
6,341,861 B1 * 1/2002 Sasaki ........................ 101/227

FOREIGN PATENT DOCUMENTS

JP 8-2090 1/1996
JP 10-291306 11/1998
JP 10-291307 11/1998

* cited by examiner

*Primary Examiner*—Robert Beatty
(74) *Attorney, Agent, or Firm*—Fitzpatrick, Cella, Harper & Scinto

(57) ABSTRACT

An image forming apparatus having a recording head and a recording medium conveying apparatus for conveying the recording medium from one position to another position. The recording medium conveying apparatus includes a rotary body pair capable of holding the recording medium, a driving device for rotatably driving the rotary body pair, and a rotary body moving device for moving the rotary body from one position to another position. The rotary body moves to a first position for receiving the recording medium from the recording head in a first route and conveying it to a second route, and a second position for conveying the recording medium from the first route to a fixing section in a third route.

20 Claims, 19 Drawing Sheets

(b)

(a)

(b)

(a)

IMAGE FORMING APPARATUS WITH HEAT TREATING OF RECORDING MATERIAL

BACKGROUND OF THE INVENTION

1. Field of the Invention

This invention relates to an image forming apparatus such as photocopier, printer, or the like and, more particularly, to an image forming apparatus in which sheets on which images are formed at an image forming section are conveyed with a directional change to a Ring section.

2. Description of Prior Art

In a printer, as an example of an image forming apparatus, some recently feature high printing quality of photographic tone, and to create a high class feeling of photography from printing paper, such a printer frequently uses, as a printing medium serving as a sheet to which images are printed, thick paper based materials like printing paper, or film based materials other than paper.

Various techniques producing images to print on those printing media have been known, and as indicated in JP-A-8-2090 (JP-A- is an abbreviation of "Japanese Unexamined Patent Publication") and JP-A-10-291306, a method has been known to obtain a high quality printing of a photographic tone by using a printing medium requiring a thermal processing and by applying the thermal processing at a fixing section to this printing medium after making printing at a printing section.

FIG. 18 is a diagram showing a printing section and a fixing section of a conventional printer. In this printer, a recording medium S requiring a thermal fixing processing after printing is introduced to a fixing section 102 upon changing the conveyance direction at a conveyance route 104 after printing is made at a printing section 101.

Because the recording medium S requiring a thermal fixing processing is rigid, printing may be disrupted in a case that the printing force from a fixing roller 103 formed at the fixing section 102 affects the conveyance of the recording medium S, where the recording medium S is introduced in the fixing section 102, and where a front end of the recording medium S is made to enter in the fixing section 102 while the printing is made on the recording medium S. Moreover, where the recording medium S passes through a conveyance route having a small curvature, the route affects the conveyance of the recording medium S, thereby disrupting the printing, and in the worst situation, preventing the recording medium from being conveyed.

To solve such disadvantages, one apparatus has been known, e.g., as shown in FIG. 19, having a conveyance route 106 in which the recording medium is not introduced into the fixing section 102 until printing is finished and whose radius of curvature is designed relatively large. In FIG. 19, numeral 105 is a conveyance roller pair. The conveyance roller pair 105 disengages the contact between the two rollers 105*a*, 105*b* so that the conveyance of the recording medium is not affected from the nipping force during printing. Numeral 107 is a reverse portion formed on a downstream side of the conveyance route 106 having a large radius of curvature. A reverse roller 108 is provided at the reverse portion 107 for reversing the recording medium.

With the printer thus structured, the recording medium is sent in a direction for the fixing section 102 by reversing the rotational direction of the reverse roller 108 right before the rear end of the recording medium is disengaged from the reverse roller 108.

Such a conventional printer can convey relatively rigid recording media without affecting the printing operation, but the printer apparatus body becomes large because the printer requires the conveyance route 106 having a large radius of curvature. When a conveyance route having such a large radius of curvature is formed, the conveyance route becomes longer, thereby lowering the throughput. On the other hand, if the apparatus body is made compact to solve those problems, the behaviors of the recording medium during fixing may cause to disturb the printing operation on the subsequent recording media.

With the view to improve those current circumstances, it is an object of the invention to provide an image forming apparatus in which apparatus size can be made compact and in which the throughput can be improved.

SUMMARY OF THE INVENTION

A representative structure according to the invention to solve the above problems is to provide a recording medium conveying apparatus for conveying a recording medium from one position to another position, the recording medium conveying including a rotary body pair capable of holding the recording medium, a drive means for rotatively driving the rotary body, and a moving means for moving the rotary body pair to a first position for conveying the recording medium from a first route to a second route and a second position for conveying the recording medium to other than the above.

DESCRIPTION OF PREFERRED EMBODIMENTS

Hereinafter, preferred embodiments according to the invention are described with reference to drawings.

First Embodiment

Figure 1:
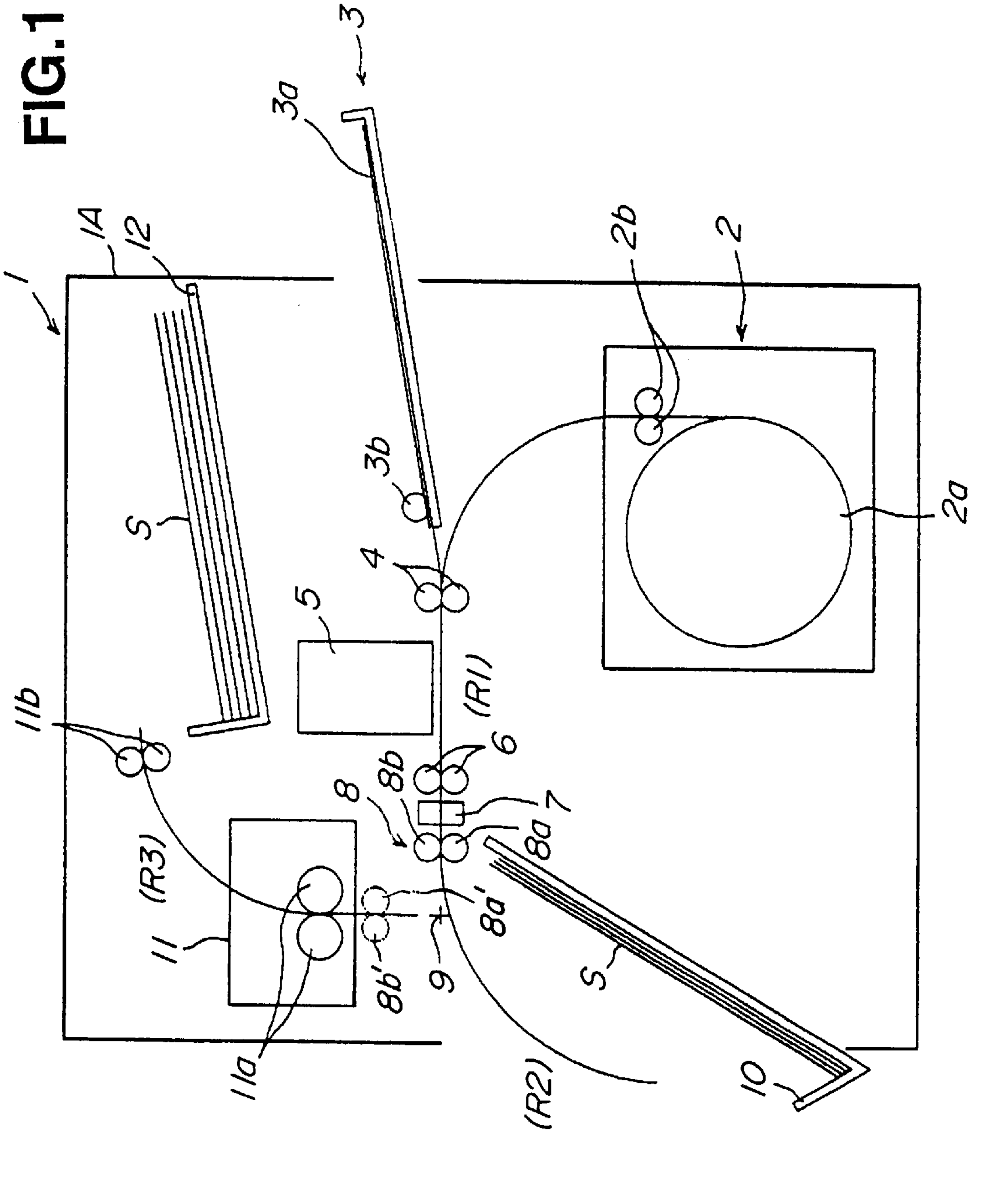
FIG. 1 is an illustration showing a schematic structure of a printer serving as an example of an image forming apparatus according to the first embodiment of the invention.

FIG. 1 is an illustration showing a schematic structure of a printer serving as an example of an image forming apparatus according to the first embodiment of the invention.

In FIG. 1, numeral 1 is a printer; numeral 1A is a printer body; numeral 2 is a first feeding. section for feeding sheets on which data are printed. The first feeding section 2 includes a roll paper 2*a* serving as a sheet (recording medium) having a long strip shape wound in a roll shape and a feeding roller pair 2*b* for feeding the roll paper 2*a*. Numeral 3 is a second feeding section; the second feeding section 3 includes a sheet or sheets 3*a*, and a feeding roller 3*b* for feeding the sheets. Numeral 4 is a pair of conveyance rollers; those conveyance rollers 4 convey, toward a downstream side, the roll paper 2*a* and the sheet 3*a* (hereinafter, collectively referred to as "recording medium") which are fed by the first feeding section 2 or the second feeding section 3.

Numeral 5 is a printing section disposed on a route R1 serving as an image forming section at which data are printed on a recording medium according to instructions from a personal computer not shown. Numeral 6 is a pair of conveyance rollers for conveying on the downstream side the recording medium on which data are printed by the printing section 5. Numeral 7 is a cutter for cutting, after printing, the roll paper 2*a* fed from the first feeding section 2. This cutter 7 does not operate with respect to the sheet 3*a* fed from the second feeding section 3. Numeral 11 is a fixing unit disposed on a third route R3 constituting a fixing section having a fixing roller pail 11*a* rotating by a motor, not shown; numeral 11*b* is a delivery roller pair 11*b*.

With this printer 1, various type recording media such as, for example, a material based on photographic printing paper, a material based on a plain paper, and the like, can be used. The recording medium based on a photographic printing paper has a coating layer coated on a surface of the paper, and after printing, this coating layer is heated and melted by the fixing unit 11 to create a gloss feeling generally possessed by photograph pictures. The surface coating with the coating layer also functions to cut off contact to the air, thereby improving the weatherproof property.

On the other hand, the material based on the plain paper is not necessary to be heated with the fixing unit 11 because the surface is not subject to such a coating. Accordingly, after printing ends, the material should be delivered outside the apparatus body without fed to the fixing unit 11.

This printer 1 therefore includes a first delivery tray 10 serving as a delivery section for storing the post-printed recording media when printing is made on a recording medium not necessarily subjecting to heating and fixing process, such as a recording medium based on a plain paper, and a second delivery tray 12 for storing the recording media after printing and fixing when printing is made on a recording medium requiring heating and fixing, such as a recording medium based on photographic printing paper.

In FIG. 1, numeral 8 is a direction changing roller pair serving as a conveying means for conveying the recording medium to the fixing unit 11 in changing the direction in a case when the recording medium is necessarily subject to heating and fixing after receiving the recording medium conveyed from the printing section 5 and to the first delivery tray 10 in a case when the recording medium is not necessarily subject to heating and fixing. The direction changing roller pair 8 temporarily holding the recording medium on the second route R2 includes a drive roller 8*a* as a conveyance rotary body, and a driven roller 8*b* as a driven rotary body rotating as driven in pressured contact with the drive roller 8*a* selectively.

The direction changing roller pair 8 is held pivotally around a fulcrum or supporting point 9 as a center to the printer body 1A. The drive roller 8*a* and the driven roller 8*b* pivotally move unitedly or separately to a first position as shown with a solid line for receiving the recording medium conveyed from the printing section 5 and to a second position as shown with a double dotted chain line for transferring the recording medium toward the fixing unit 11 in changing the direction.

That, the roll paper 2*a* serving as a recording medium is conveyed in the second route R2 via the direction changing roller pair 8 from the first route R1 on which the printing section 5 is disposed, and is conveyed to the fixing unit 11 on the third route R3 via the direction changing roller 8 from the second route R2 when fixing processing is necessary. If the fixing processing is not necessary, the roll paper 2*a* is delivered from the second route R2 to the delivery tray 10 located on a downstream side of the second route R2.

In a meantime, the printer body 1 is formed with a drive section 20 serving as a drive means for rotatively driving the drive roller 8*a* of the direction changing roller pair 8, a pivotally moving section 30 serving as a moving means for selectively, pivotally moving the direction changing roller pair 8 from the first position shown with the solid line to the second position shown with the broken line around the fulcrum 9 as a center when the recording medium is conveyed, and a drive roller locking section 40 serving as a locking means for holding the driven roller 8*b* at the second position.

The drive section 20 for rotatively driving the drive roller 2*a* includes a rotatively driving motor 21. a first gear series

20A for transmitting the rotation of the rotatively driving motor 21 to a drive gear 8*d* attached to one end of a drive shaft 8*c* to which the drive roller 8*a* is secured, and a second gear series 20B.

The first gear series 20A includes a first gear 23 in mesh with a motor gear 22 assembled with pressure to a motor shaft 12*a* of the rotatively driving motor 21, and a drive transmission gear 24 in mesh with the first gear 23 for transmitting the rotation of the first gear 23 to the drive gear 8*d*.

The second gear series 20B includes a second gear 25 in mesh with the motor gear 22 at a position facing to the first gear 23, a third gear 26 in mesh with the second gear 25, and a drive transmission gear 27 in mesh with the drive gear 8*d* for transmitting the rotation of the third gear 26 to the drive gear 8*d* when the drive roller 8*a* moves to the second position.

Because the second gear series 20B has an extra one gear in comparison with the first gear series 20A, the rotational direction of the drive transmission gear 27 in mesh with the drive gear 8*d* can be reverse to the rotational direction of the drive transmission gear 24 of the first gear series 20A. Therefore, where the drive roller 8*a* moves to the second position, the drive roller 8*a* can rotate in the conveyance direction.

Meanwhile, the pivotally moving section 30 for pivotally moving the direction changing roller pair 8 from the first position to the second position when the recording medium is conveyed includes a pair of drive roller arms 34 serving as first arms whose one end is secured to a shaft 9*a* constituting the fulcrum 9 (see, FIG. 1) and whose other end holds rotatably the drive shaft 8*c* of the drive roller 8*a*, a pair of driven roller arms 35 serving as second arms whose one end is secured to a shaft 9*a* and whose other end holds rotatably the shaft 8*e* of the driven roller 8*c*, and pivotally moving means for pivotally moving the drive roller arm 34.

The driven roller arm 35 is urged toward a direction returning from the second position to the first position by a spring 36. The pivotally moving means includes a pivotally moving drive motor 31 rotatable in the normal direction as well as the reverse direction, and a gear portion constituted of a drive gear 32 assembled with pressure to a motor shaft 31*a* of the pivotally moving drive motor 31, and a transmission gear 33 engaged with the drive gear 32 and attached to one end of the shaft 9*a*.

In the pivotally moving section 30 thus structured, when the pivotally moving motor 31 rotates in the normal direction, the drive gear 32 and the transmission gear 33 rotate, and according to this motion, the shaft 9*a* rotates in an arrow direction. When the shaft 9*a* rotates thus, the drive roller arm 34 secured to the shaft 9*a* moves pivotally upward according to this motion. Moreover, where the drive roller arm 34 moves pivotally upward, the driven roller 8*b* is pushed upward by the drive roller 8*a,* so that the driven roller arm 35 pivotally moves upward in opposing to the urging force of the spring 36.

If the pivotally moving drive motor 31 rotates reversely, the shaft 9*a* rotates in a direction opposite to the arrow direction, and according to this motion, the drive roller arm 34 pivotally moves downward. The driven roller 8*b*, as described below, moves pivotally downward according to the urging force of the spring 36.

The driven roller locking section 40 for holding the driven roller 8*b* at the second position is held in a manner that is capable of rocking by a rocking shaft 42*a* and includes a locking member 42 having an engagement piece 42*b* for engaging with the shaft 8*e* of the driven roller 8*b* at a tip of the member, a spring 43 for urging the locking member 42 in a direction locking the driven roller 8*b*, or namely, in the counterclockwise direction, and a solenoid 44 for rocking the locking member 42 in a direction disengaging the locking of the driven roller 8*b*.

The locking member 42 is normally urged in a direction rendering the driven roller 8*b* locked by the spring 43, and as described above, when the driven roller arm 35 pivotally moves upward by the pivotally moving section 30, the driven roller 8*b* is locked with the locking member 42.

When the solenoid 44 operates in this situation, the locking member 42 rocks in a direction disengaging the locking state of the driven roller 8*b*. Where the locking member 42 is made to rock and the locking state of the locking member 42 is disengaged, the driven roller arm 35 pivotally moves and returns to the first position by the spring 36.

Moreover, when the pivotally moving drive motor 31 rotates reversely where the driven roller 8*b* is locked with the driven roller locking section 40, the drive roller arm 34 pivotally moves and returns to the first position.

Figure 3:
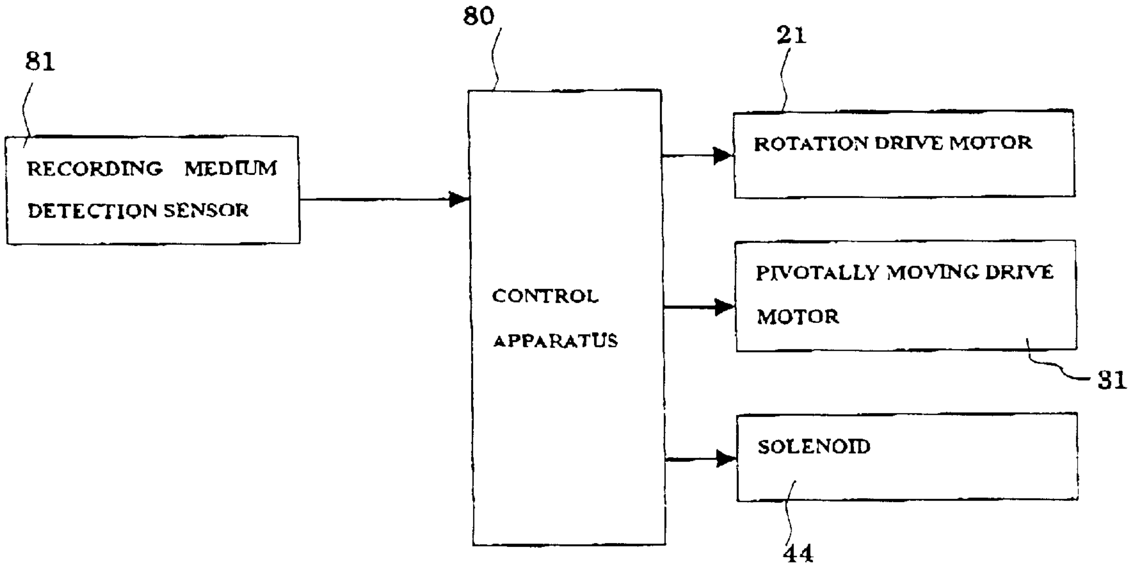
FIG. 3 is a block diagram showing a control system of the control apparatus formed in the printer.

FIG. 3 is a diagram showing control blocks of the printer 1. In FIG. 3, numeral 80 is a control apparatus for controlling printing operation of the printer 1 as well as controlling respective operations of the drive section 20, the pivotally moving section 30, and the driven roller locking section 40. The control apparatus 80 controls the pivotally moving drive motor 31 to rotate normally so as to pivotally move the direction changing roller pair 8 from the first position to the second position based on a signal from a recording medium detection sensor 81 where, for example, the recording medium detection sensor 81 arranged on a downstream side of the printing section 5 detects the recording medium and inputs the signal to the control apparatus 80 after printing is made on the recording medium at the printing section 5.

The control apparatus 80 drives the pivotally moving drive motor 31 in the normal and reverse directions as to pivotally move the drive roller arm 34 (drive roller 8*a*) to be returned to the first position before the subsequent recording medium enters in the first position after the recording medium is transferred to the fixing unit 11.

After the conveyance is not needed any more by the drive roller 8*a* thus moved to the second position, printing can start on the subsequent recording medium where the drive roller 8*a* is moved from the second position to the first position before the subsequent recording medium proceeds to the first position. This move renders possible fixing of the previous recording medium and, at the same time, printing of the subsequent recording medium, thereby improving the throughput during the successive printing.

The control apparatus 80, after the pivotally moving drive motor 31 is thus driven to reverse rotate, turns the solenoid 44 on so that the driven roller arm 35 (driven roller 8*b*) is pivotally moved to return to the first position by the spring 36. Upon return of the driven roller 8*b* thus pivotally moved, the subsequent recording medium entered in the first position can be clamped together with the drive roller 8*a,* so that the recording media can be conveyed readily.

Figure 4:
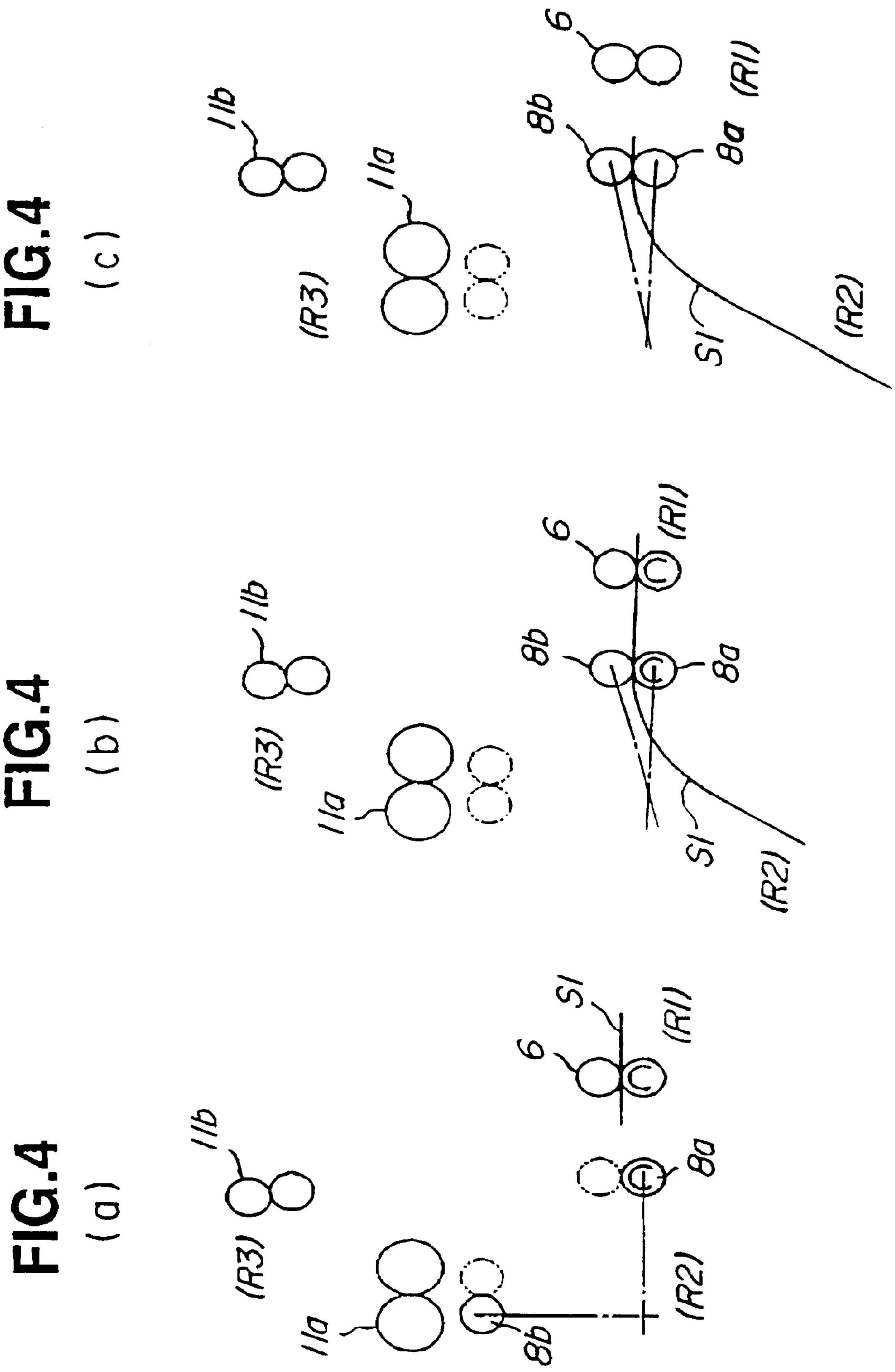
FIGS. 4(*a*)–4(*c*) are a first set of diagrams showing control operation of the above control apparatus, FIGS. 5(*a*) and 5(*b*) are a second set of diagrams showing control operation of the above control apparatus.
Figure 5:
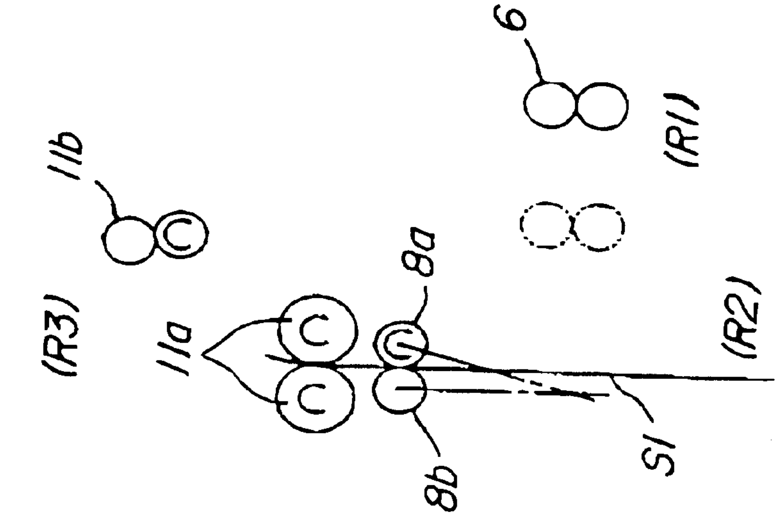
Figure 5:
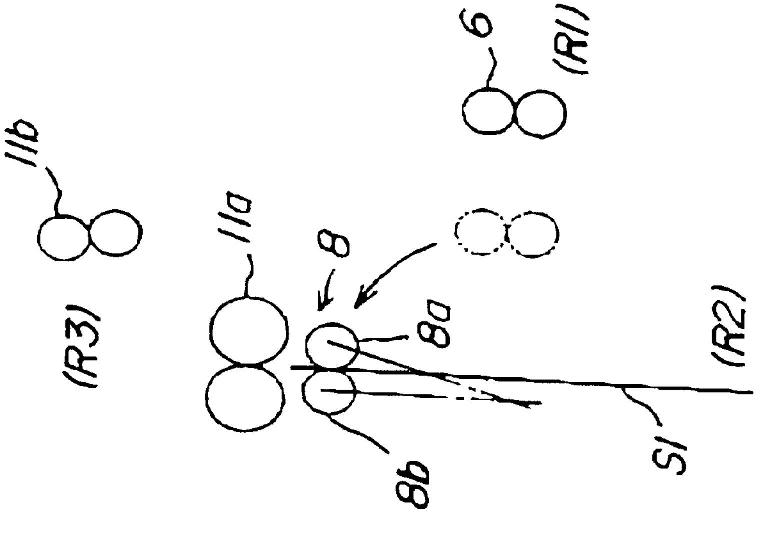
Figure 6:
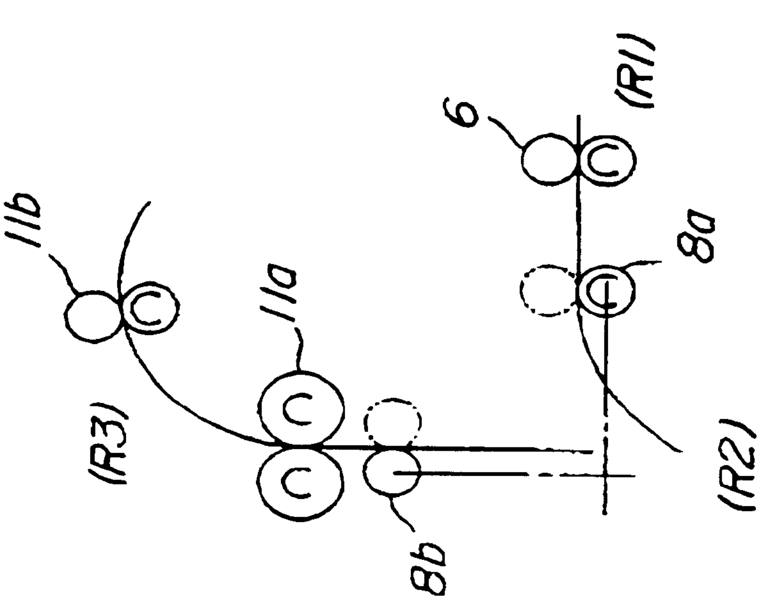
FIGS. 6(*a*) and 6(*b*) are a third set of diagrams showing control operation of the above control apparatus.
Figure 6:
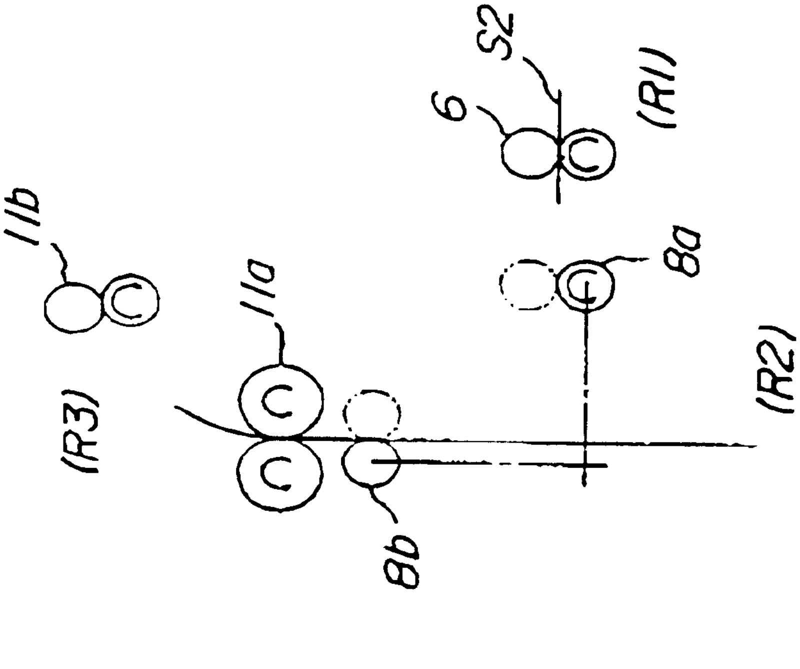

Referring to FIGS. 4 to 6. control operation of the control apparatus 80 thus structured is described next.

FIG. 4(*a*) is a diagram showing a state that printing is made on the recording medium S1 of the first sheet. The drive roller 8*a* of the direction changing roller pair 8 at that time takes the first position, and the driven roller 8*b* is in a state that the roller 8*b* is locked at the second position by the driven roller locking section 40.

Where printing ends on the recording medium S1 after the recording media S1 of the first sheet is inserted in the first position under the above situation, the control apparatus 80 operates the solenoid 44 of the driven roller locking section 40. By this operation, locking of the driven roller 8*b* is disengaged, and the driven roller 8*b* is moved from the second position to the first position as shown in (b), so that the recording medium S1 is clamped with the driven roller 8*b* and the drive roller 8*a* as well.

Figure 2:
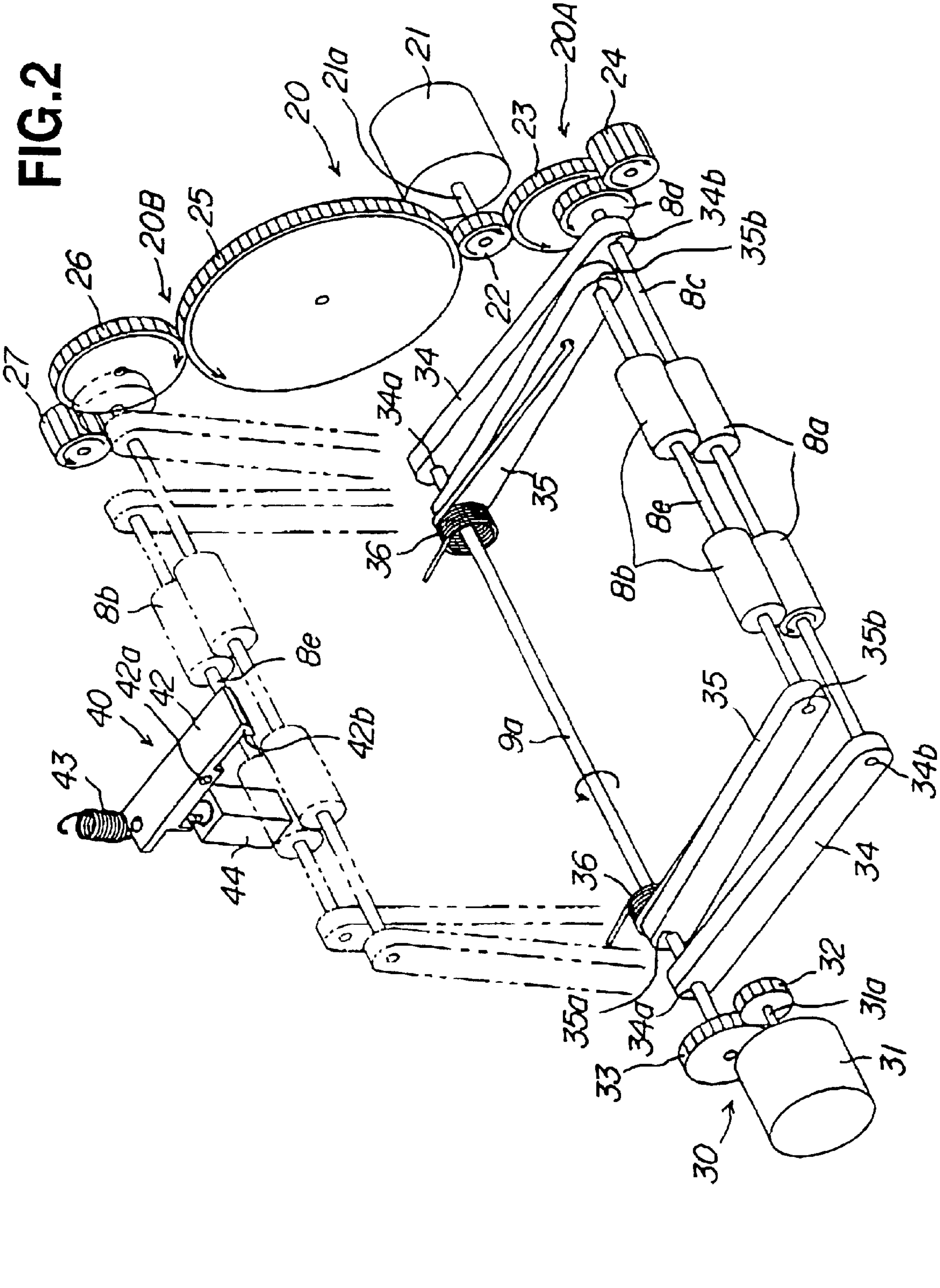
FIG. 2 is a perspective view for describing a structure of a direction change roller, a drive section, a pivotally moving section, a driven roller locking portion, which are formed at the printer.

In this state, because the drive roller 8*a* is located at the first position, the drive gear 8*d* is engaged with the drive transmission gear 24 of the first gear series 20A as shown in FIG. 2, and therefore, while the rotatively driving motor 21 rotates, the drive roller 8*a* rotates in the counterclockwise direction, thereby conveying the recording medium S1 in a direction delivering from the apparatus body.

Subsequently, the recording medium S1 is conveyed according to the rotation of the drive roller 8*a*, and as shown in (c) if the rear end of the recording medium S1 is conveyed very closely to the direction changing roller pair 8, the rotatively driving motor 21 is temporarily stopped to stop the rotation of the direction changing roller pair 8.

After the direction changing roller pair 8 is thus stopped, the pivotally moving drive motor 31 of the pivotally moving section 30 is driven in the normal direction. Where the pivotally moving drive motor 31 thus rotates normally, the rotation of the pivotally moving drive motor 31 is transmitted to the shaft 9*a* via the drive gear 32 and the transmission gear 33, thereby rotating the shaft 9*a*.

Where the shaft 9*a* thus rotates, the drive roller arm 34 pivotally moves upward according to this movement, and where the drive roller arm 34 thus moves pivotally upward, the driven roller 8*b* is pushed upward by the drive roller 8*a*, so that the driven roller arm 35 also pivotally moves upward in opposition to the urging force of the spring 36. With this operation, the direction changing roller pair 8 pivotally moves as shown in FIG. 5(*a*) from the first position to the second position as clamping the recording medium S1.

The direction changing roller pair 8 pivotally moves to the second position, the shaft 8*e* of the driven roller 8*b* engages with the engagement piece 42*b* of the locking member 42 and enters in a locking state. Meanwhile, the drive gear 8*d* of the drive roller 8*a* engages with the drive transmission gear 27 of the second gear series 20B, and the drive roller 8*a* rotates in the arrow direction as shown in (b). The fixing roller 11*a* also rotates with a motor not shown, thereby transferring the recording medium S1 to the fixing roller 11*a* of the fixing unit 11 from the direction changing roller pair 8.

When the front end of the recording medium S1 enters in the area of the fixing roller 11*a*, the pivotally moving drive motor 31 is rotatively driven in the reverse direction at a predetermined timing. Thus, the pivotally moving drive arm 34 pivotally moves in the clockwise direction, and according to this movement, the drive roller 8*a* moves down from the second position to the first position. It is to be noted that the recording medium S1 may not fall down even if the drive roller 8*a* pivotally moves where the front end of the recording medium S1 is thus clamped by the fixing roller 11*a*. The driven roller 8*b* maintains the state that the roller is held at the second position because the shaft 8*e* is locked with the engagement piece 42*b* of the locking member 42.

The drive roller 8*a* moves down to the first position as the drive transmission gear 24 engages with the drive gear 8*d*, and the drive roller 8*a* stops pivotally moving operation and begins rotating. During this period, the recording medium S1 of the first sheet continues to be subject to fixing, and simultaneously, printing starts on the recording medium S2 of the second sheet.

The rear end of the recording medium S1 of the first sheet then passes by the position of the driven roller 8*b* through a state shown in (b), and the recording medium S1 of the first sheet is delivered to the second delivery tray 12. When printing on the recording medium S2 of the second sheet ends, the solenoid 44 is turned on. The locking member 42 starts rocking around the rocking shaft 42*a* as a center in opposing to the spring 43, and according to this movement, the engagement piece 42*b* of the locking member 42 is disengaged from the shaft 8*e* of the driven roller 8*b*.

If locking is thus disengaged, the driven roller 8*b* moves to the first position upon urged from the spring 36, stops in contact with the drive roller 8*a*, and enters in a state as shown in FIG. 4(*b*). The operation shown in FIG. 5(*a*) and thereafter is repeated with respect to the recording medium S2 of the second sheet.

Thus, after the recording medium S1 is received, the apparatus can easily change the direction of the recording medium S1 even if the recording medium S1 is rigid without use of a conveyance route having a large radius of curvature, so that the printer 1 can readily be made compact.

In this embodiment, the direction changing roller pair 8 is disposed over the first delivery tray 10 as shown in FIG. 1, and where the direction changing roller pair 8 is disposed at such a position, a space over the first delivery tray 10 can be utilized as a direction changing region of the recording media, so that the printer body 1A can be made compact.

Printing on the second sheet can start readily where the drive roller 8*a* and the driven roller 8*b* are separately moved pivotally and where the drive roller 8*a* only is returned to the first position from the second position during the fixing operation on the recording medium S1 of the first sheet, This operation allows the subsequent printing starting early during the fixing operation in a case of the continuous printing, thereby improving the throughput.

The description above concerns the recording medium S2 which is delivered to the second delivery tray 11 after printed and heated with the fixing unit 11. In a case where the recording medium is of, e.g., a plain paper basis, which does not require a passage through the fixing unit 11, the apparatus maintains the state shown in FIG. 4(*b*), and the drive roller 8*a* is made to rotate until the rear end of the recording medium S1 is released from the direction changing roller pair 8, thereby delivering the recording medium S1 on the first delivery tray 10.

Second Embodiment

Figure 7:
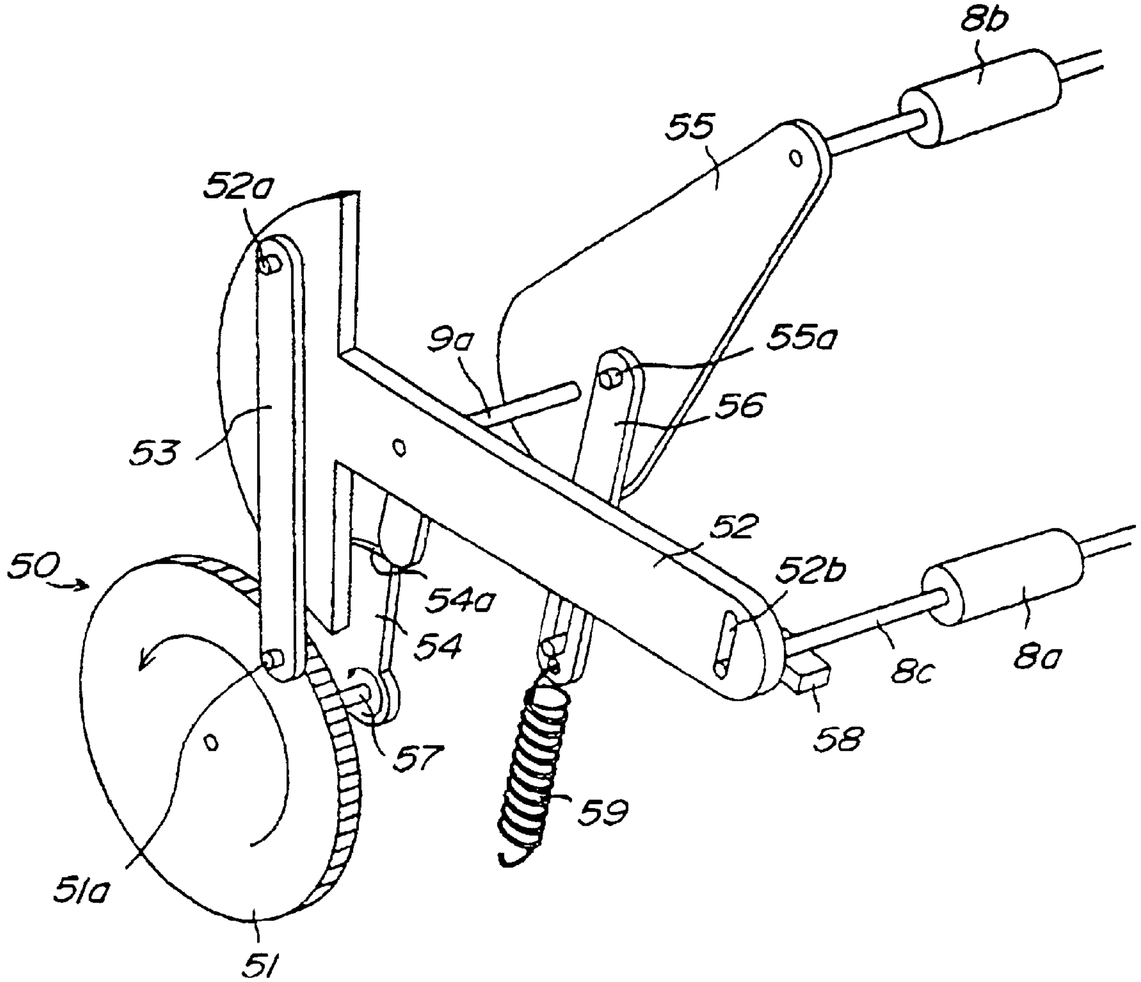
FIG. 7 is an illustration showing a structure of a direction change roller pair and a pivotally moving section for pivotally moving the direction change roller pair in a printer serving as an example of an image forming apparatus according to the second embodiment of the invention.

FIG. 7 is an illustration showing a structure of a direction change roller pair and a pivotally moving section for pivotally moving the direction change roller par in a printer serving as an example of an image forming apparatus according to the second embodiment. In FIG. 7, the same reference numbers as those in FIG. 2 indicate the same or equivalent portions, and in FIG. 7, only a portion on the front or closer side of the pivotally moving section is shown. In FIG. 7, shown is a state that the drive roller 8*a* is placed at the first position and that the drive roller 8*b* is placed at the second position.

In FIG. 7, numeral 50 indicates a pivotally moving section for pivotally moving the direction changing roller pair 8 from the first position to the second position when the recording medium is conveyed. The pivotally moving section 50 has a drive roller arm 52 as a first arm secured to the shaft 9*a*, a driven roller arm 55 rotatably attached to shaft 9*a*, and a pivotally moving means for pivotally moving the drive roller arm 52.

A supporting hole 52*b* extending in a vertical direction is formed at one end of the drive roller arm 52 for supporting the drive shaft 8*c* of the drive roller 8*a*. The drive roller 8*a* is in contact with a stopper 58 while the drive roller 8*a* is located at the first position.

The pivotally moving means includes a motor not shown, a rotary body 51 for rotating in the arrow direction upon receiving the rotational drive from the motor, and a connection plate 53 connecting a projection 51*a* formed on a surface of the rotary body 51 with a projection 52*a* formed on a surface of the drive roller arm 52 and moving the drive roller arm 52 in a direction for pivotally moves the arm upon the rotation of the rotary body 51. In this embodiment, the connection plate 53 converts rotary movement of the rotary body 51 into liner movement, and thereby the drive roller arm 52 pivotally moves around the shaft 9*a* as a center according to the rotation of the rotary body 51.

Numeral 54 is a cam attached to a shaft 57 of the rotary body 51; numeral 56 is an actuator 56 supported to a projection 55*a* formed on a surface of the driven roller arm and urged in a direction pressing a cam surface of the cam 54 by an elastic force of a spring 59.

Now, pivotally moving operation of the direction changing roller pair of the pivotally moving section 50 thus structured is described.

Figure 8:
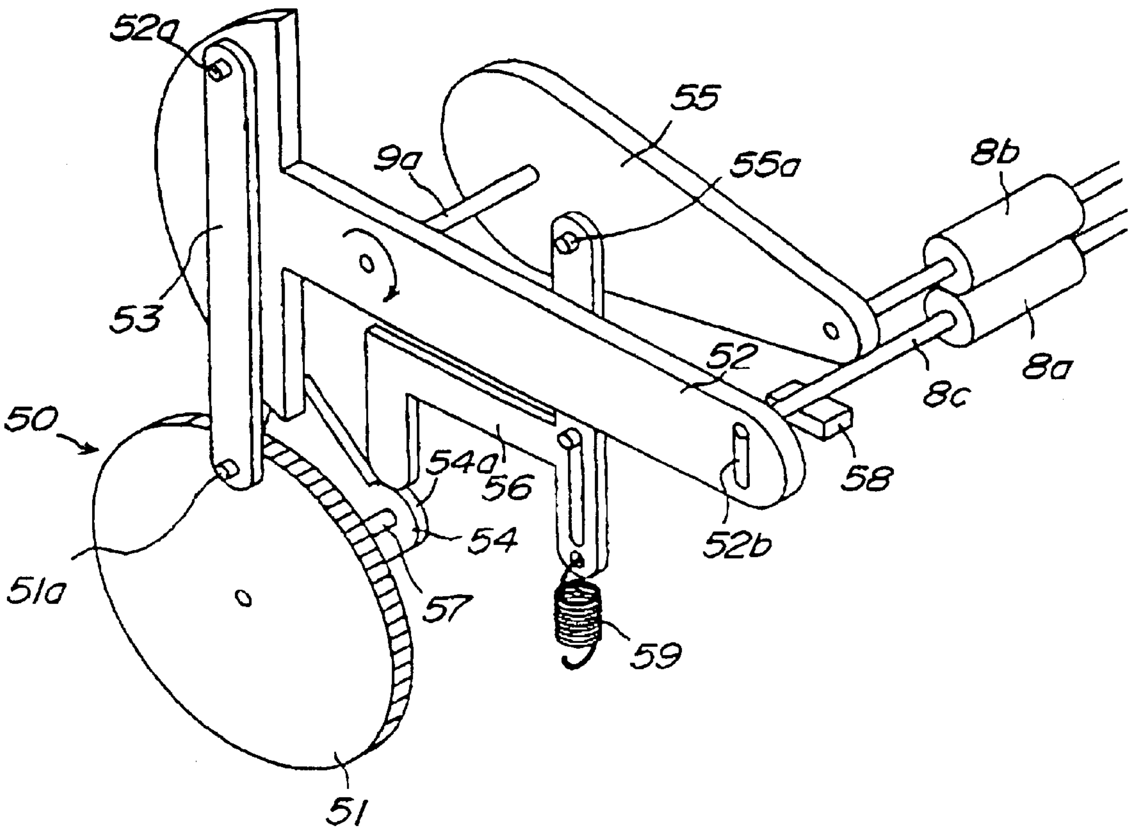
FIG. 8 is a diagram showing a state where the direction change roller pair is located at a first position.

When the rotary body 51 rotates slightly in the arrow direction from the state shown in FIG. 7, the projection 51*a* moves to an apex portion according to the rotation of the rotary body 51, and according to the movement of the projection 51*a,* the connection plate 53 is pushed upward, thereby pivotally moving the drive roller arm 52 around the shaft 9*a* as a center in the clockwise direction as shown by an arrow in FIG. 8.

It is to be noted that the drive shaft 8*c* of the drive roller 8*a* comes in contact with a top of the supporting hole 52*b* and in contact with the stopper 58, so that the drive roller 8*a* does not move down any more. The supporting hole 52*b* of the drive roller arm 52 creates a play for pivotal movement of the drive roller arm 52 and prevents the arm from interfering with the roller.

The cam 54 also rotates to the same extent as the rotation of the rotary body 51. The cam surface 54*a* of the cam 54 greatly reduces the distance from the center of the shaft 57 as rotating, and the actuator 56 that urged downward by the spring 59 moves down along the cam surface 54*a*. When the actuator 56 thus moves down, the driven roller arm 55 pivotally moves around the shaft 9*a* as a center in association with the down movement of the actuator 56, and the driven roller 8*b* stops upon contacting to the drive roller 8*a*.

In a meantime, when the rotary body 51 further rotates, the projection 51*a* of the rotary body 51 moves to the bottom, and the connection plate 53 is pulled down according to this movement of the projection 51*a*. By this movement, the drive roller arm 52 pivotally moves in the counterclockwise direction around the shaft 9*a* as a center, and thereby, the drive roller 8*a* moves to the second position.

Where the drive roller 8*a* thus moves, the driven roller 8*b* moves to the second position in association with this movement. and furthermore, where the driven roller 8*b* moves in such a manner, the driven roller arm 55 and the actuator 56 also move up in opposition to the elastic force of the spring 59.

Where the rotary body 51 further rotates thereafter, the projection 51*a* moves from the bottom to the top portion, and the connection plate 53 is pulled up according to the movement of the projection 51*a*. The drive roller arm 52, according to this movement, pivotally moves around the shaft 9*a* as a center, and the drive roller 8*a* thereby moves to the first position.

When the rotary body 51 thus rotates, the cam 54 is placed below the actuator 56, and the driven roller arm 55 does not move downward while the actuator 56 comes in contact with the cam 54 even where the drive roller arm 52 pivotally moves. Therefore, the drive roller 8*a* moves first as shown in FIG. 7, and after pressured contact of the actuator 56 with the cam 54 is released, the driven roller 8*b* moves to the first position.

According to pivotally moving section 50 of this embodiment, the direction changing roller pair 8 can be controlled by one directional rotary drive, and the solenoid 44 to be used when the driven roller 8*b* held at the second position is returned to the first position, becomes unnecessary, so that the apparatus can be formed inexpensively. Since the driven roller 8*b* can be returned slowly when returned from the second position to the first portion, the driven roller 8*b* can be returned quickly by the spring 59 after disengagement of the lock, thereby preventing the surface of the recording medium from being damaged due to collisions to the recording medium.

In the above description, the driven roller 8*b* is pivotally moved in association with the pivotal movement of the drive roller 8*a*, and the drive roller 8*b* is locked at the second position. To the contrary, the drive roller 8*a* can be pivotally moved in association with the pivotal movement of the driven roller 8*b*, and the drive roller 8*a* can be locked at the second position.

Third Embodiment

Figure 9:
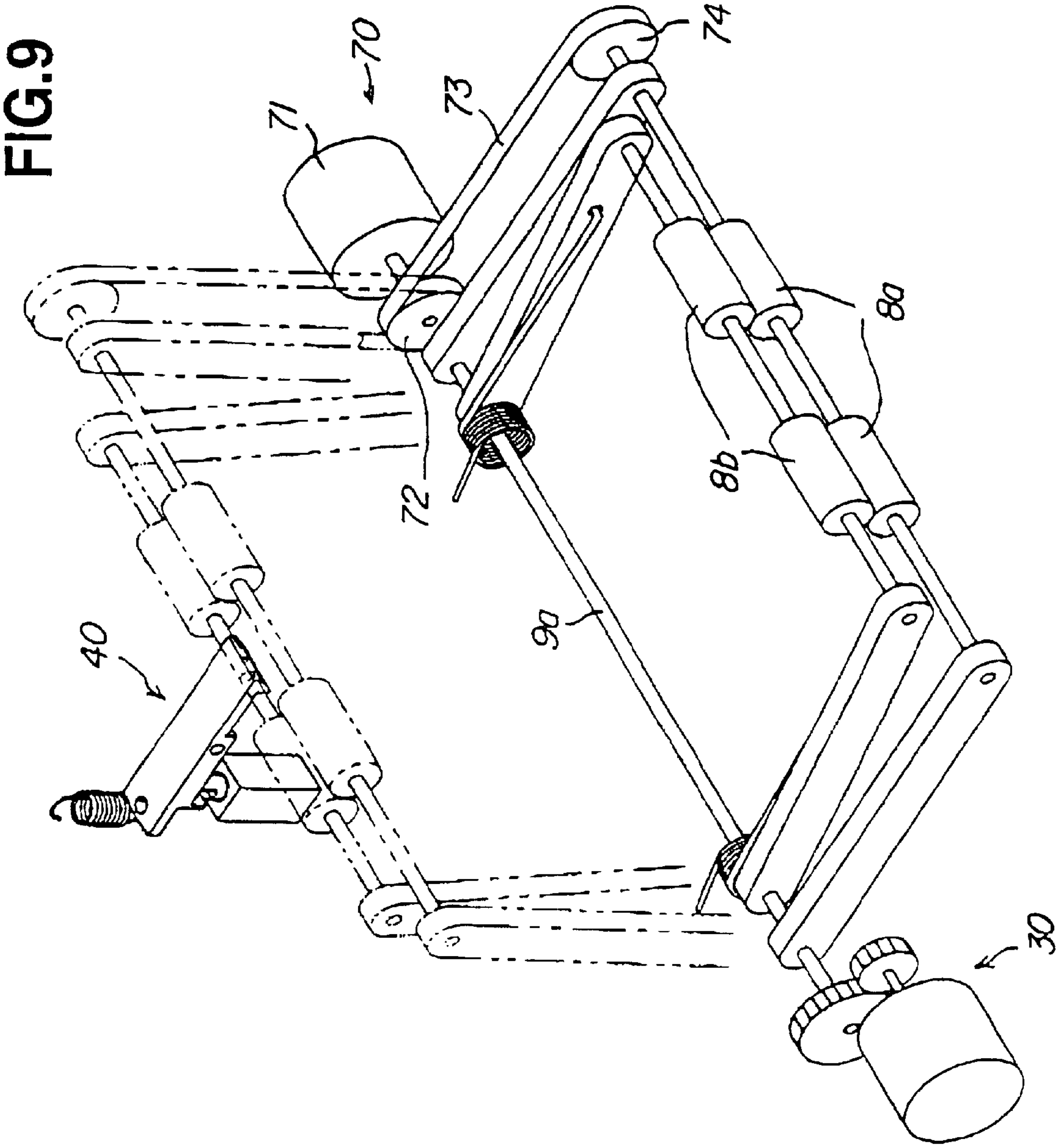
FIG. 9 is an illustration showing a structure of a direction change roller pair and a drive section for driving the direction change roller pair in a printer serving as an example of an image forming apparatus according to the third embodiment of the invention.

FIG. 9 is an illustration showing a structure of a direction change roller pair and a drive section for driving the direction change roller pair in a printer serving as an example of an image forming apparatus according to the third embodiment. In FIG. 9, the sane reference numbers as those in FIG. 2 indicate the same or equivalent portions.

In FIG. 9, numeral 70 is a drive section for rotatively driving the drive motor 8*a*; the drive section 70 includes a rotary drive motor 71, a drive pulley 72 rotating unitedly with the rotary drive motor 71, a drive belt 73, and a drive transmission means receiving the rotary drive of the drive motor 71 via the drive belt 73 and having a pulley 74 rotating unitedly with the drive roller 8*a*. The rotational centers of the drive motor 71 and the drive pulley 72 are coaxial to the center of the shaft 9*a*.

In the drive portion 70 thus structured, the drive motor 71, the drive pulley 72, and the pulley 74 rotate in the counterclockwise direction, respectively to rotate the drive roller 8*a* in the counterclockwise direction where the drive roller 8*a* is located at the first position.

On the other hand, the drive roller 8*a* moves to the second position, the pulley 74 moves to the second position together with the drive roller 8*a*. Then, the drive motor 71 is made to rotate in a direction reverse to the above, or namely, in the clockwise direction to rotate the drive roller 8*a* in the clockwise direction. According to this movement, the drive motor 71, the drive pulley 72, and the pulley 74 rotate in the counterclockwise direction. When the drive roller 8*a* pivotally moves to the second position, drive motor 71, the drive pulley 72, and the pulley 74 rotate in the counterclockwise direction, the distance between the centers of the drive pulley 72 and the pulley 74 does not change because the pivotally moving center 9*a* coincides with the center of the drive pulley 72.

It is to be noted that although the drive transmission means is structured of the drive motor 71, the drive pulley 72, and the pulley 74 in this embodiment, the drive transmission means can be structured of gears or the like.

Fourth Embodiment

Figure 10:
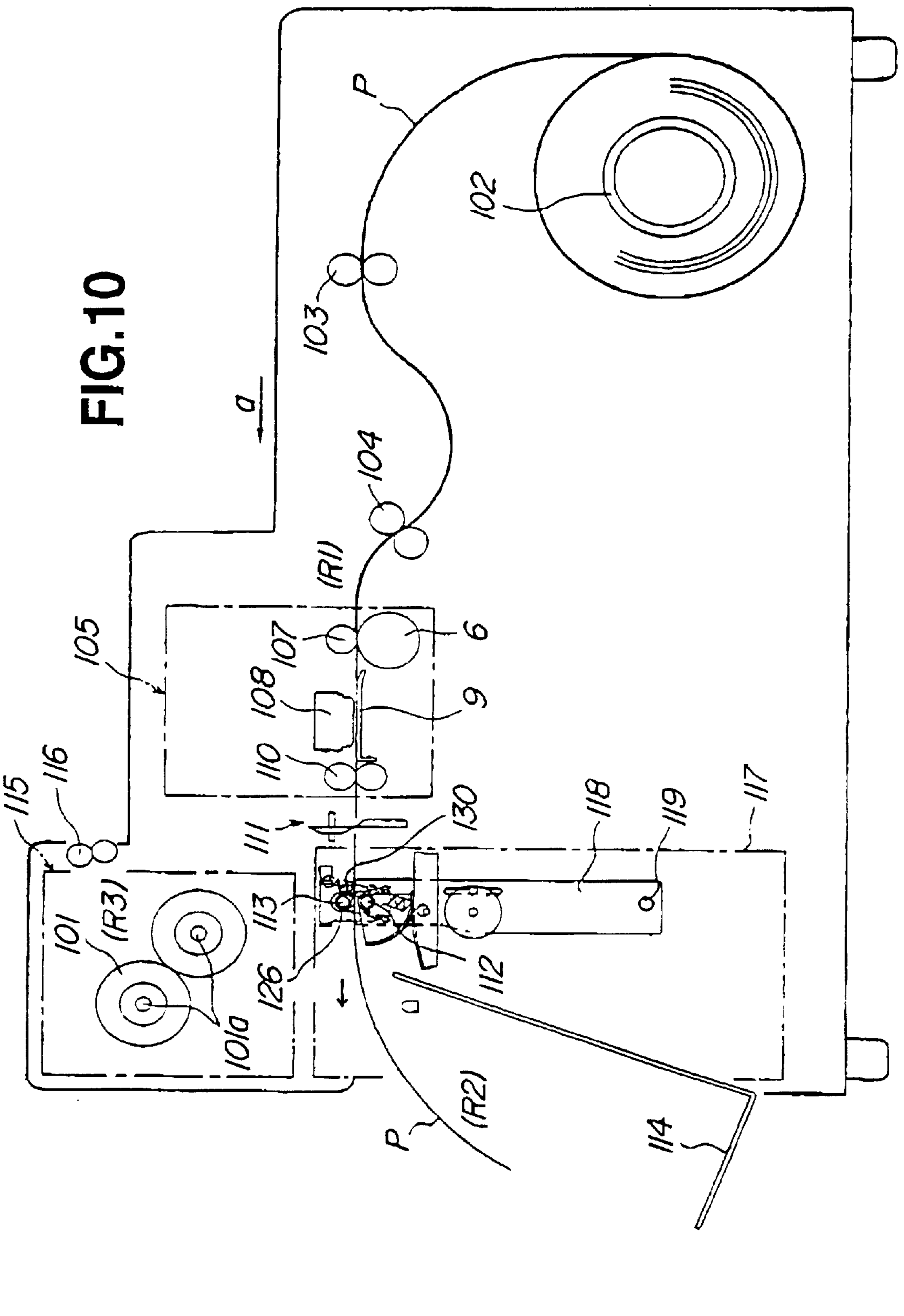
FIG. 10 is a cross-sectional diagram showing an image forming apparatus according to the fourth embodiment of the invention.
Figure 11:
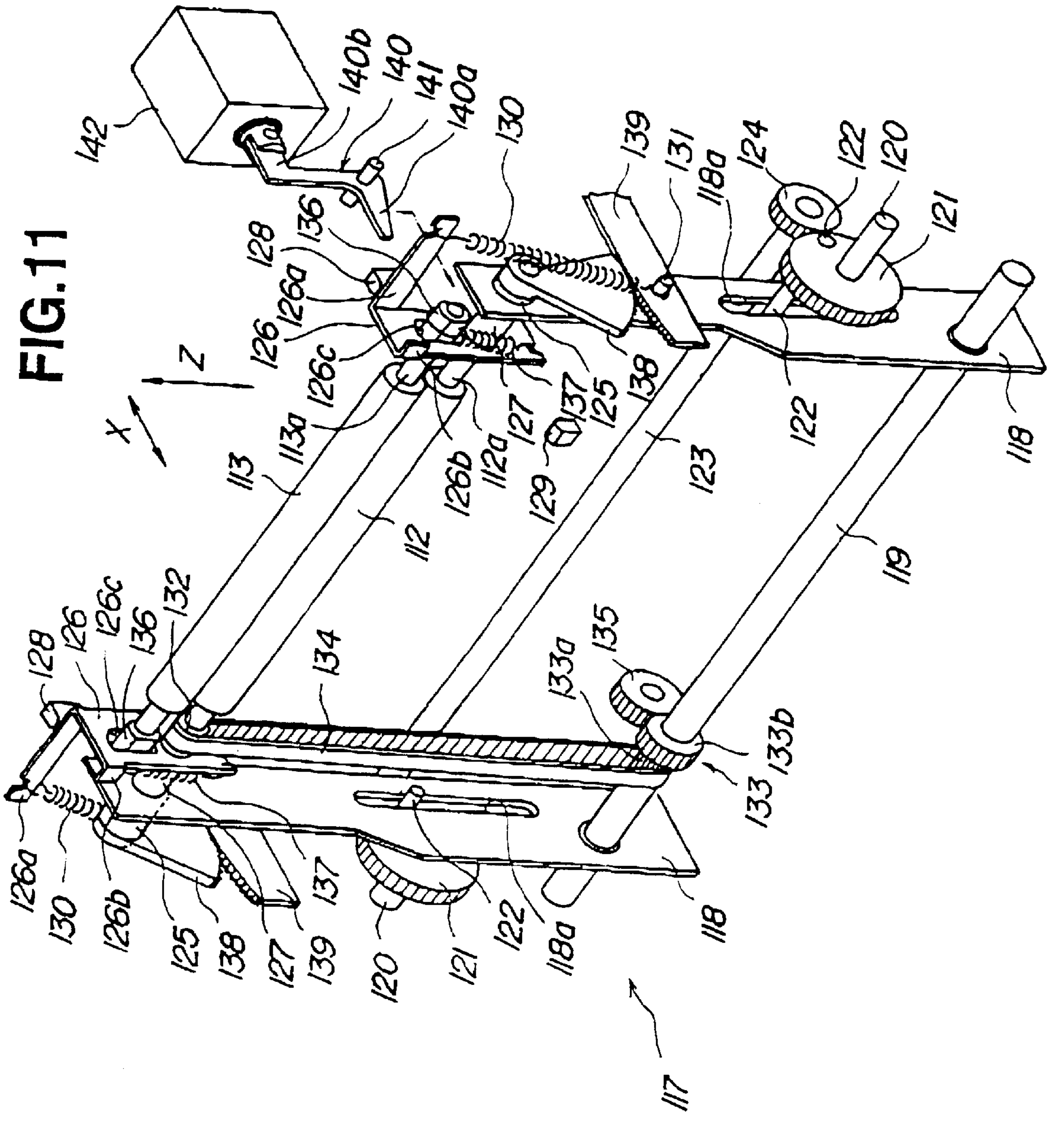
FIG. 11 is a perspective view showing a recording medium conveying apparatus in the image forming apparatus shown in FIG. 10.
Figure 12:
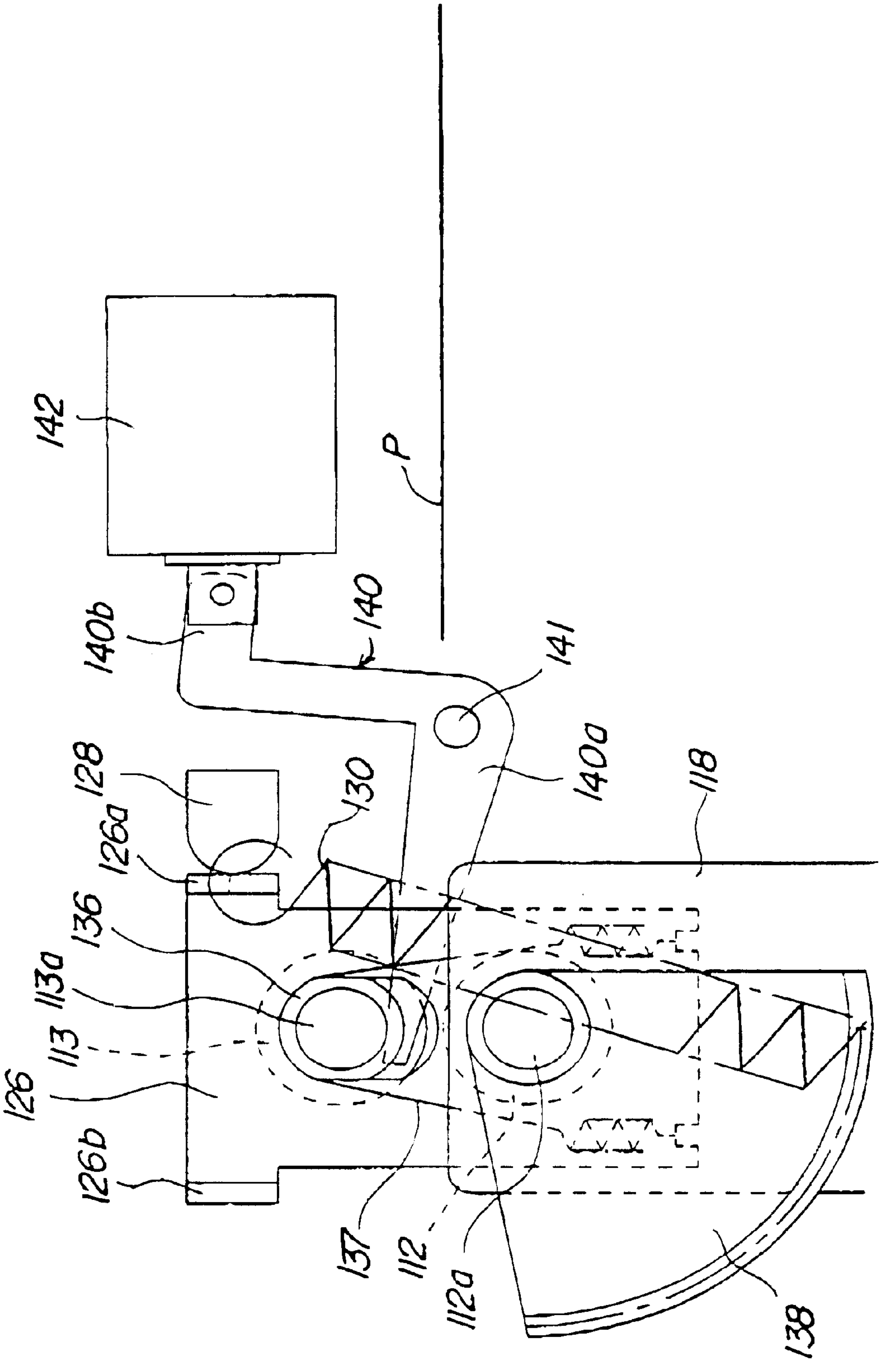
FIG. 12 is a cross-sectional diagram showing a structure of a disengaging means for separating the rotary body pair from each other.

Referring to FIG. 10 through FIG. 12, a recording medium conveying apparatus and a recording apparatus having this conveying apparatus as an embodiment according to the invention are described in detail. FIG. 10 is a cross-sectional diagram showing the image forming apparatus having the recording medium conveying apparatus according to the invention: FIG. 11 is a perspective view showing the recording medium conveying apparatus of the fourth embodiment; FIG. 12 is a cross-sectional diagram showing a structure of a disengaging means for separating the rotary body pair from each other.

Figure 13:
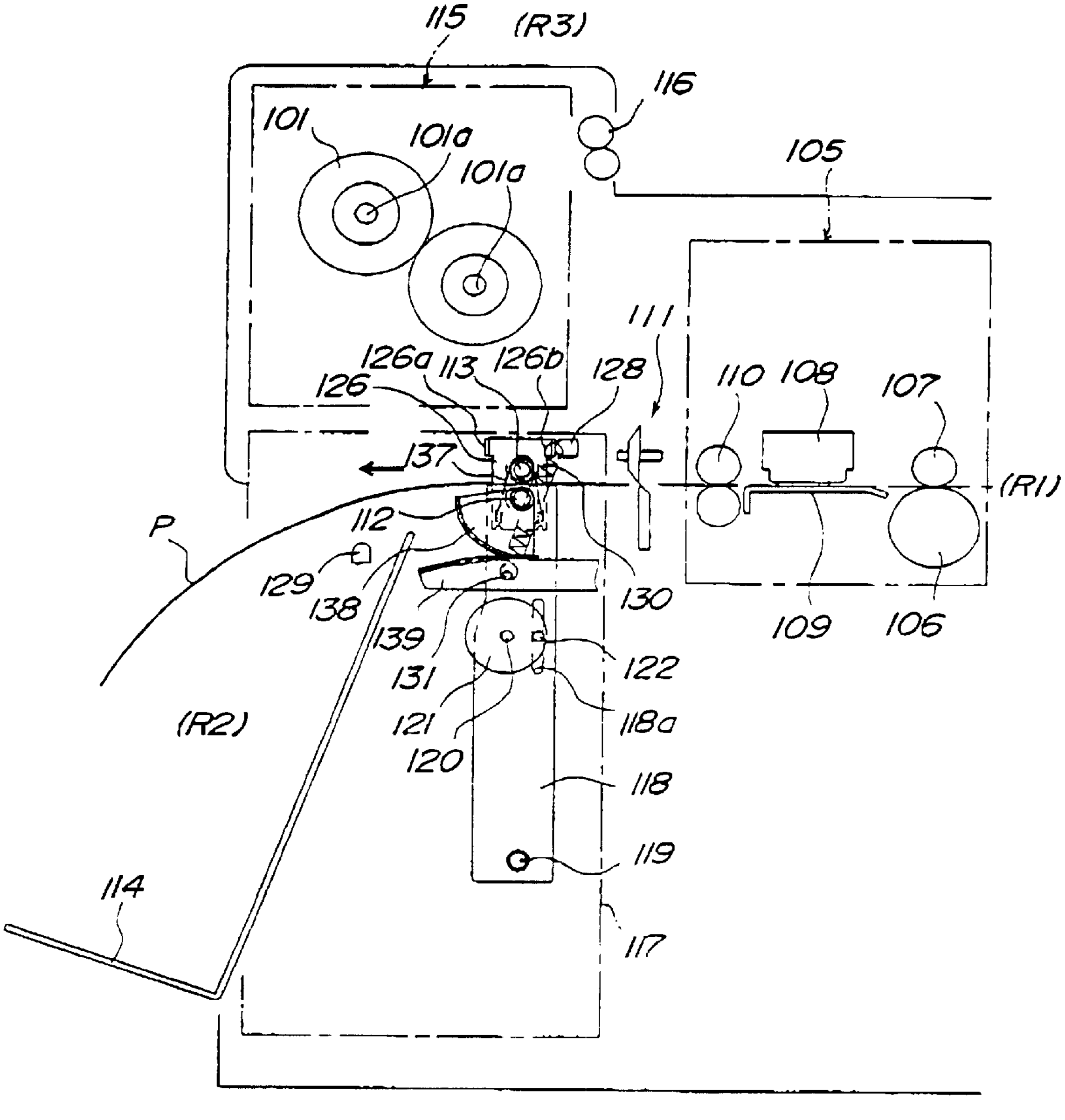
FIG. 13 is a cross-sectional diagram showing the rotary body pair that moved to a first position at which the recording medium is conveyed.
Figure 14:
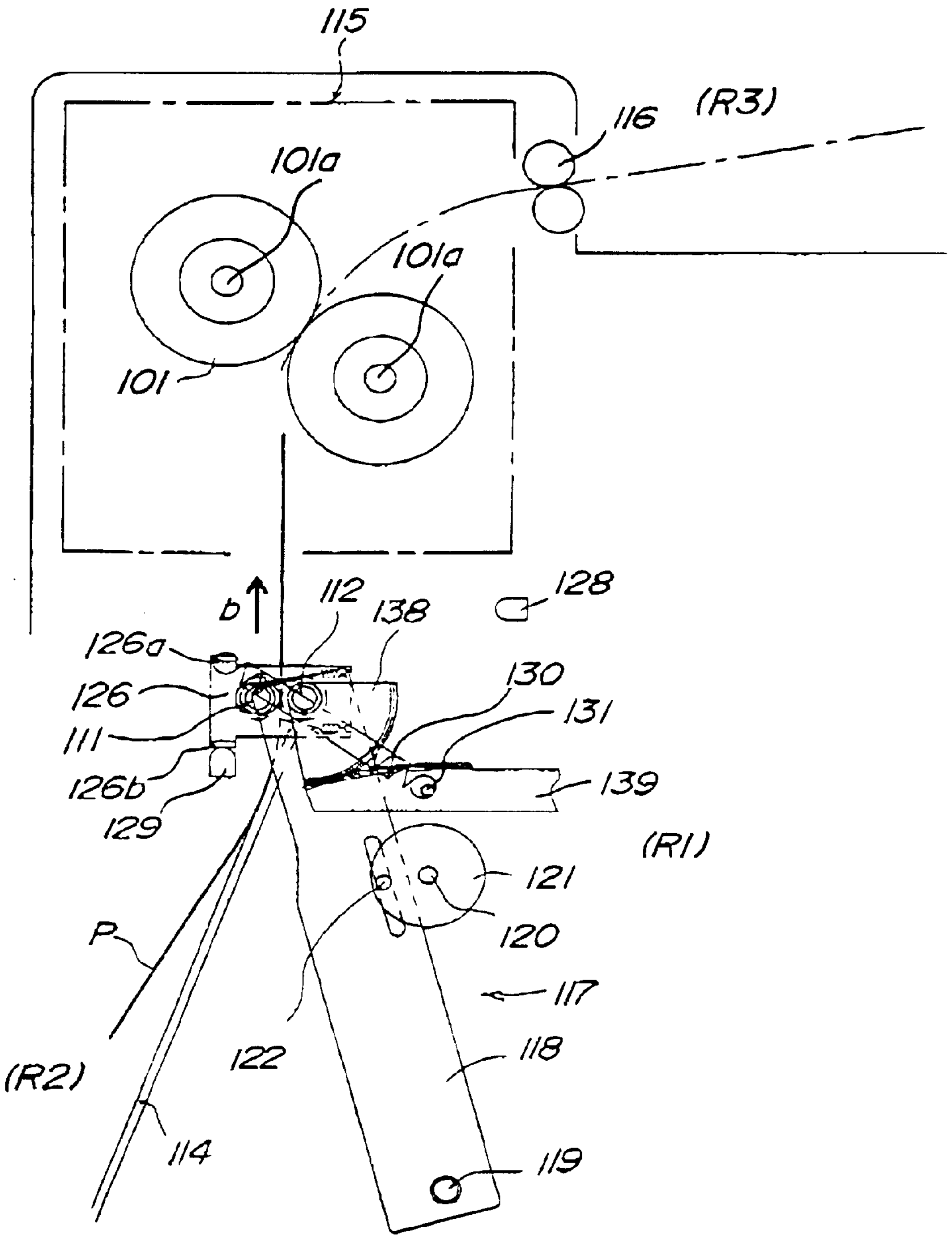
FIG. 14 is a cross-sectional diagram showing the rotary body pair that moved to a second position at which the recording medium is conveyed toward a thermal processing means.
Figure 15:
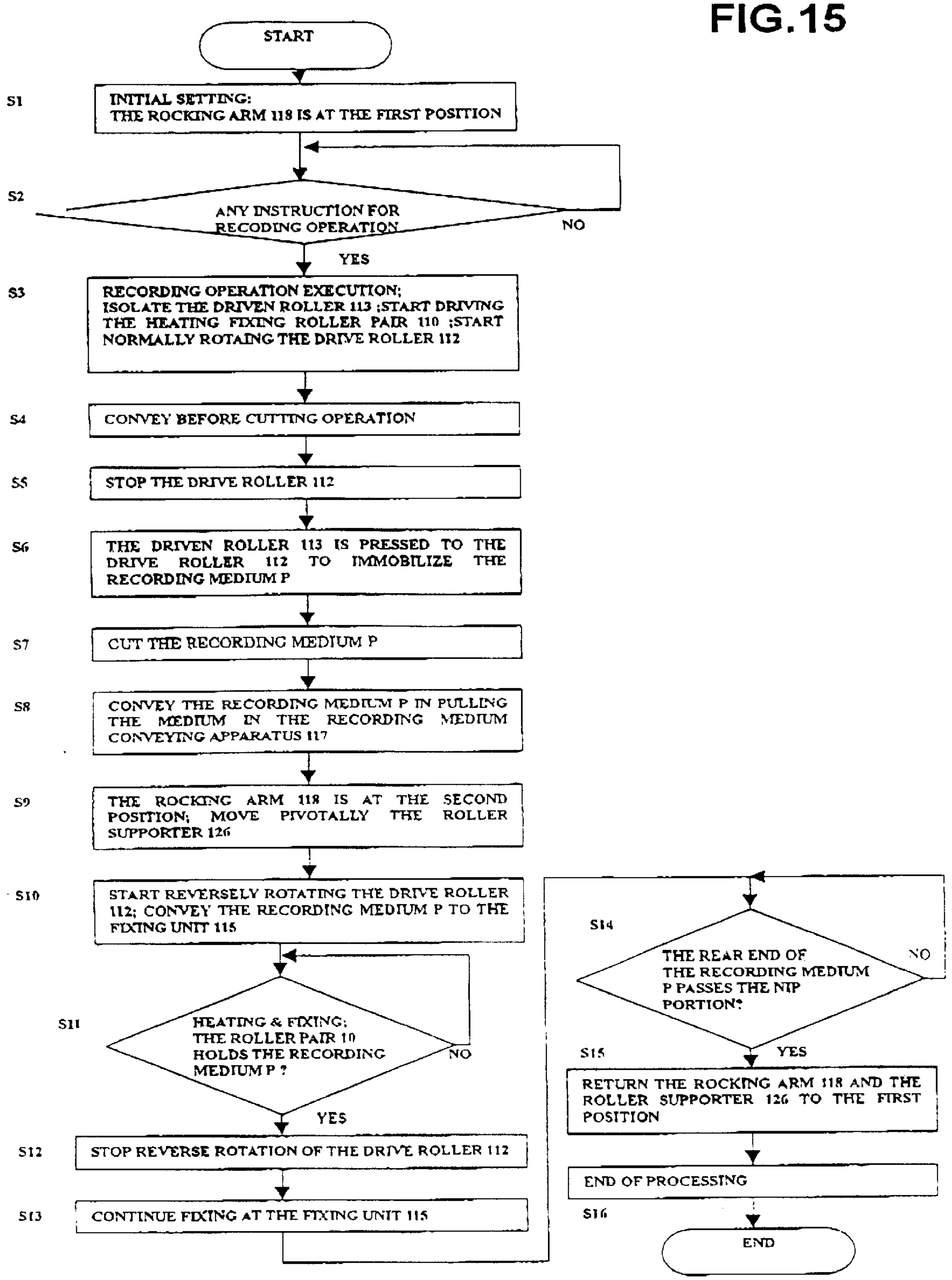
FIG. 15 is a flowchart showing operation where the recording medium is delivered upon fed to the thermal processing means.
Figure 16:
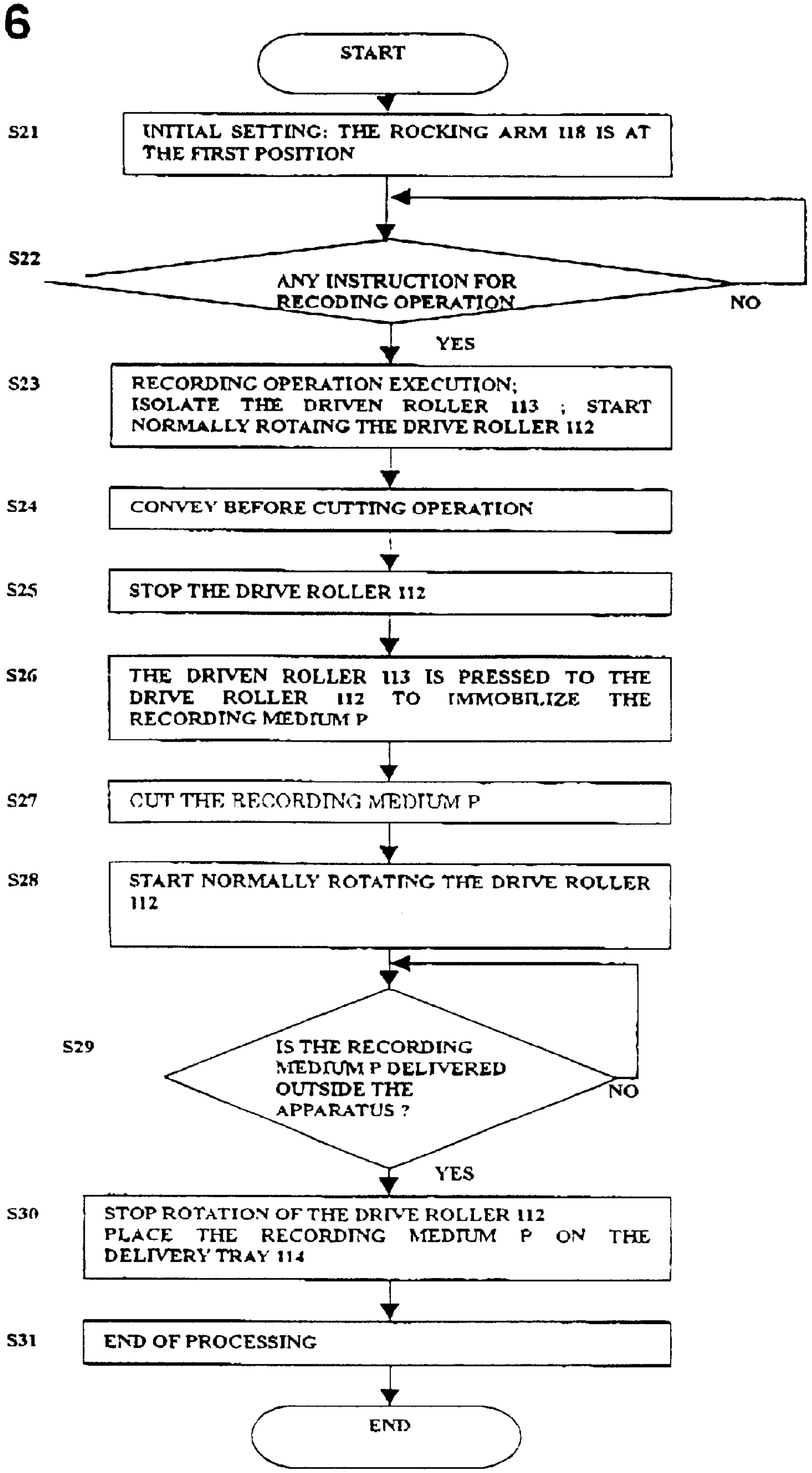
FIG. 16 is a flowchart showing operation where the recording medium is delivered without fed to the thermal processing means.

FIG. 13 is a cross-sectional diagram showing the rotary body pair that moved to a first position at which the recording medium is conveyed; FIG. 14 is a cross-sectional diagram showing the rotary body pair that moved to a second position at which the recording medium is conveyed toward a thermal processing means; FIG. 15 is a flowchart showing operation where the recording medium is delivered upon fed to the thermal processing means; FIG. 16 is a flowchart showing operation where the recording medium is delivered without fed to the thermal processing means.

First, referring to FIG. 10. the whole structure of the recording apparatus having the recording medium conveying apparatus according to the invention is described. In FIG. 10, the recording medium P has a multilayered structure made of a latex layer of an ink permissive structure formed as an outmost surface and an ink absorptive holding layer formed below the latex layer. When the ink is attached to the surface of the recording medium P, the ink reaches the ink absorptive holding layer upon permission through the latex layer.

Where the surface of the recording medium P is thermally processed in being pressed by a heating fixing roller 101 serving as a thermally processing means, the latex layer located on the surface turns into a flat film shape, and the recording medium comes to have material property as modified. This processing will protect the ink absorptive holding layer and improves waterproof property as well as weatherproof property of the recording medium P. Moreover, images are fixed because the thermal processing evaporates moisture of the ink absorbed in the recording medium P.

The recording medium P extends longitudinally and is held rotatably on a paper core as wound in a roll shape. The recording medium P is sent in arrow a direction in FIG. 10 upon pulled up by a pulling up roller pair 103. A buffer roller pair 104 conveys in arrow a direction in FIG. 10 the recording medium P pulled up by the pulling up roller pair 103 so that the rotational load of the recording medium P does not interfere with the downstream side.

In a recording section 105, the recording medium P is conveyed intermittently by a certain amount respectively by a sub-scanning roller 106 and a pinch roller 107. An inkjet recording head serving as a recording means mounted on a main scanning carriage, not shown, moves reciprocally in a direction perpendicular to the paper surface in FIG. 10 after each intermittent conveyance, and thereby, images of a prescribed width are recorded by means of the inkjet recording head 108 on the recording medium P in spraying ink in corresponding to the image signal.

As a recording means in this apparatus, an inkjet recording method in which the recording head 108 sprays an ink to make recording is used. That is, the recording head 108 has fine orifices (liquid spraying openings), liquid passages, energy operating portions provided in respective liquid passages, and energy generating means for generating droplet forming energy to work on liquid in the energy operating portion.

As for the energy generating means for generating such energy, there are some recording methods such as a recording method using an electromechanical converter such as piezo elements, a recording method using energy generating means on which an electromagnetic wave such as a laser beam is radiated to make heating which operates to spray the droplets, a recording method using an energy generating means in which liquid is heated by an electrothermal converter such as a heat generating element having heat-generating resistors to spray liquid, or the like.

Among those methods, the recording head employed for the inkjet recording method to spray liquid by thermal energy can produce high resolution recordings because the orifices for forming spraying droplets upon spraying droplets for recording can be arrayed with a high density Among those recording heads, a recording head employing electrothermal converters as energy generating means is advantageous because the head is easier to be made compact, can fully utilize recent technological advancements in the semiconductor technology and merits on the IC technology and the micro fabrication technology whose reliability is remarkably improved, can easily make parts mount with high density, and can make the production cost reduced.

Although in the above mentioned embodiment, the inkjet recording method is employed as a recording means, it is further desirable to constitute the recording means such that the electrothermal converter is powered on corresponding to a recording signal and that ink is sprayed to make recordings from orifices by using the bubble growth and shrink created in the ink by film boiling in the ink produced by thermal energy applied from the electrothermal converter.

As far as the representing structures or principles concerned, it is also desirable to use fundamental principles, for example, as disclosed in specifications of U.S. Pat. Nos. 4,723,129 and 4,740,796.

A platen 109 disposed as facing to the inkjet recording head 108 is to support the recording medium P flatly from a lower side in a movable range of the inkjet recording head 108 to keep the isolation distance between a nozzle surface of the inkjet recording head 108 and the recording medium P with a good accuracy.

A subsidiary roller pair 110 rotates in synchrony with the intermittent conveyance drive of the sub-scanning roller 106 and restricts the recording medium P as to contact with the platen 109. The recording section 105 includes the sub-scanning roller 106, a pinch roller 107, the inkjet recording head 108, the platen 109, the subsidiary roller pair 110, and the like.

A cutter 111 is disposed on a downstream side in the conveyance direction of the recording medium (hereinafter, referred to simply as "on a downstream side"). The cutter 111 is a mechanism for cutting the recording medium P according to movement of the rotary cutter teeth in a direction perpendicular to the paper surface shown in FIG. 10. The rear end of the recording medium P that finishes the recording operation is temporarily conveyed to the cutter 111, and after the drive roller 112 serving as a rotary body pair disposed on a downstream side of the cutter 111 and the nip portion of the driven roller 113 disposed in facing to the drive roller 112 are made in pressed contact with each other to immobilize the recording medium P, the recording medium P is cut out.

The drive roller 112 is capable of rotating in the normal and reverse directions. The recording medium P cut by the cutter 111 is conveyed further on the downstream side as clamped by the drive roller 112 and the driven roller 113. The recording medium P is either delivered as it is or, after the drive roller 112 is stopped temporarily as the recording medium P is held before the rear end of the recording medium P passes through the nip portion between the drive roller 112 as shown in FIG. 14 and the driven roller 113 and after the position of the drive roller 112 and the driven roller 113 is reversed about 90 degrees, conveyed to the nip portion of a heating fixing roller pair 101 of a fixing unit 115 serving as a thermal processing means where the recording medium P is conveyed in arrow b direction in FIG. 14 in a way that the rear end of the recording medium P goes first by reverse rotation of the drive roller 112.

The heating fixing roller 101 is structured in a hollow roller shape. The interior of the heating fixing roller 101 has a heated 101*a* inserted, which heats the heating fixing roller 101. The latex layer on the surface of the recording medium P is turned into a flat film form upon passing over the nip portion of the heating fixing roller 101 and is modified, and furthermore, the recording medium P can improve the waterproof and weatherproof property of the recording medium P where the moisture in the ink absorptive holding layer is evaporated.

A delivery roller pair 116 is disposed on a downstream side of the heating fixing roller pair 101, and the recording medium P is delivered out of the apparatus by the delivery roller pair 116.

Referring to FIG. 11 to FIG. 14, a structure of the recording medium conveying apparatus 117 in which the drive roller 112 and the driven roller 113 are formed as the rotary body pair. In FIG. 11, a pair of rocking arms 118, as a moving means for moving the drive roller 112 and the driven roller 113 serving as the rotary body pair to a first position at which the recording medium P is conveyed shown in FIG. 13 as well as to a second position at which the recording medium P is conveyed to the fixing unit 115 as shown in FIG. 14, is supported in capable of rocking around a rocking center shaft 119 located at a stable position with respect to the apparatus body.

A pair of operation gears 121 rotatable around a rotary shaft 120 as a center supported rotatably to a stable position on the apparatus body is disposed on an outer side of the pair of the rocking arms 118, and an operation shaft 122 secured to the operation gear 121 projecting from the side face of the gear 121 in a rotary shaft direction is inserted in a long hole 118*a* formed at a approximately center position of each rocking arm 118.

Each rocking drive gear 123 of a pair secured to a relaying drive shaft 123 rotating unitedly with the relaying drive shaft 123 is engaged with each of the pair of the operation gears 121. As the relaying drive shaft 123 rotates, the operation gear 121 meshing the rocking drive gear 124 rotates in synchrony with the relaying drive shaft 123, and the rocking arm 118 rocks around the rocking center shaft 119 as a center where the operation shaft 122 moves within the long hole 118*a*.

The rocking arm 118 can reciprocally rock in a range between the first position at which the operation shaft 122 is located on a right side in FIG. 13 with respect to the rotary shaft 120 and the second position at which the operation shaft 122 is located on a left side in FIG. 14 with respect to the rotary shaft 120.

On the other hand, a boss portion 127 is secured unitedly on an outer side of the pair of roller supporters 126 holding rotatably the drive roller 112 and the driven roller 113, and an outer peripheral portion of the boss portion 127 is held rotatably at a rotary shaft bearing 125 formed coaxially to an upper front end of the rocking arm 118 as shown in FIG. 11.

The drive roller 112 is inserted rotatably in the inner peripheral portion of the boss portion 127. The roller supporters 126 of the pair are rotatably supported to the rotary shaft bearing 12*a* round the rotary shaft bearing 125 as a center, and the rotation center of the roller supporting body is structured to be coaxial with the drive roller 112.

Engagement portions 126*a*, 126*b* bent perpendicularly from a surface on which the boss portion is formed are formed on an upper side of the roller supporters 126 in FIG. 11. According to the pivotally moving position of the roller supporters 126, the engagement portions 126*a*, 126*b* come in contact with stoppers 128, 129 formed at the stable position of the apparatus body, thereby positioning the roller supporters 126 at the first position shown in FIG. 13 and at the second position shown in FIG. 14.

An end of the toggle spring 130 is engaged with the engagement portion 126*a* of the roller supporter 126. The other end of the toggle spring 130 is engaged with tension with a pin 131 formed at a stable position of the apparatus body.

A roller pulley 132 is secured to one end of the drive roller 112, and a belt having teeth is suspended between the roller pulley 132 and a pulley portion 133*a* of the drive gear pulley 133 rotatably supported to one end side of the rocking center shaft 119 in meshing with those pulleys.

The drive gear pulley 133 is formed unitedly with a pulley portion 133*a* and a gear portion 133*b*, and the gear portion 133*b* is engaged with the drive gear 135 supported rotatably to a stable shaft disposed at a stable position of the apparatus body.

The drive gear 135 is connected to the drive means such as a motor, not shown, or the like, and operates to control the normal and reverse rotation and the stop. The drive gear 135 is rotatively driven by controlling the drive means, thereby controlling the drive roller 112 to rotate in the normal and reverse directions and to stop by way of the gear portion 133*b* meshing the drive gear 135, the pulley portion 133*a* rotating unitedly with the gear portion 133*b*, the belt 134 having teeth suspended on the pulley portion 133*a*, and the roller pulley 132 on which the belt 134 having teeth is suspended.

Because the rotation center of the drive gear pulley 133 is located on the rocking center shaft 119, the distance between shafts of the drive gear pulley 133 and the drive gear 135 does not change even where the rocking arm 118 is rocked around the rocking center shaft 119 as the center, so that the rotation drive force can be transmitted independently from rocking movement of the rocking arm 118.

The engagement relation between the belt 134 having the teeth and the roller pulley 132 does not change notwithstanding of pivotally moving position of the roller supporter 126 because the rotation center of the roller pulley 132 is located at a rotation center of the boss portion 127 even where the roller supporter 126 pivotally moves around the boss portion 127 as a center. Consequently, the drive roller 112 receives the drive force from the drive means regardless the pivotal movement position of the roller supporter 126 and the rocking position of the rocking arm 118.

The driven roller 113 is rotatably supported by a bearing 136 formed at a rotary shaft end of the driven roller 113, and the bearing 136 is fitted into a bearing long hole 126*c*, which is formed coaxially with one another over the roller supporter 126 in FIG. 2.

The bearing long hole 126*c* has a width in X direction in FIG. 11 (horizontal direction in FIG. 11) corresponding to the body width of the bearing 136, and a play can be created in Z direction in FIG. 11 while the outmost diameter portions of the drive roller 112 and the driven roller 113 are in contact with each other. Furthermore, a length of the hole is designed to isolate the driven roller 113 from the drive roller 112 as the drive roller 112 and the driven roller 113 are supported to the roller supporter 126.

A center portion of pressurizing spring 137 whose ends are engaged to lower portions of the roller supporter 126 in FIG. 11 is suspended with tension to a portion of the bearing 136 extending outward from the roller supporter 126, and the driven roller 113 is in pressurized contact with the drive roller 112 by the pressing force of the pressing spring 137.

A pivotally moving sector gear 138 is coupled and secured to an end of the boss portion 127 of the roller supporter 126, and the pivotally moving sector gear 138 moves pivotally unitedly with the roller supporter 126 through the rotary shaft bearing 125 around the rotary shaft bearing 125 as a center. The pitch circle center of the pivotally moving sector gear 138 is structured coaxially with a center of the rotary shaft bearing 125, The pivotally moving sector gear 138 and a stable sector gear 139 mesh with each other in keeping the distance between shafts in a range that the rocking arm 118 rocks around the rocking center shaft 119 as a center.

FIG. 13 is a diagram showing a position of respective structural elements when the rocking arm 118 is located at the first position. At that time, the pivotally moving sector gear 138 of the rocking arm 118 is engaged with the stable sector gear 139, the toggle spring 130 produces an urging force to pivotally move the roller supporter 126 in the clockwise direction around the boss portion 127 as a pivotally moving center.

Where the engagement portion 126 of the roller supporter 136 comes in contact with the stopper 128 located stably with respect to the apparatus body, pivotal movement of the roller supporter 126 is restricted, and the position of the roller supporter 136 is maintained.

FIG. 14 is a diagram showing that the rocking arm 118 is pivotally moved in the counterclockwise direction from the first position shown in FIG. 13 and transmitted to the second position as the operation gear 121 rotates about a half turn. The pivotally moving sector gear 138 is pivotally movable together with the roller supporter 138 around the rotary shaft bearing 125 as a center. Because the pivotally moving sector gear 138 and the stable sector gear 139 are in meshing with each other, the roller supporter 126 pivotally moves in the counterclockwise direction in FIG. 14 around the boss portion 127 when the rocking arm 118 rocks in the counterclockwise direction in FIG. 14.

At that time, the toggle spring 130 temporarily passes the highest tension position at a position where the pin 131, the boss portion 127, and the engagement portion 126*a* are aligned in a line, and when reaching the pivotally moving position shown in FIG. 14, the spring 30 changes the tensioning direction with respect to the pivotally moving center of the roller supporter 126, thereby proving a rotary force in the counterclockwise direction in FIG. 14 to the roller supporter 126.

The engagement portion 126*b* of the roller supporter 126 comes in contact with the stopper 129 located at a stable position with respect to the apparatus body and is engaged with the stopper 129, so that the pivotal movement of the rocking arm 118 is restricted, thereby maintaining the roller supporter 126 at the second position shown in FIG. 14.

As shown in FIG. 11 and FIG. 12, a releasing lever 140 as a releasing means for releasing clamping of the recording medium P made by the drive roller 112 and the driven roller 113 is pivotally movable around a lever shaft 141 as a center disposed at a stable position of the apparatus body. An operational arm 140*a* of the releasing lever 140 is disposed to be placed between a core metal end 113*a* of the driven roller 113 and a core metal portion 112*a* of the drive roller 112 when the rocking arm 118 is placed at the first position to which the recording medium P is fed as shown in FIG. 11 and FIG. 12.

An arm 140*b* to be operated of the releasing lever 140 receives a pivotally moving force upon controlling the solenoid 142 by powering the solenoid 142 which serves as a drive means placed at a stable position with respect to the apparatus body. When the solenoid 142 is not powered. the releasing lever 140 is urged in the counterclockwise direction in FIG. 12 around the lever shaft 141 as a center by a spring, not shown, and the operational arm 140*a* of the releasing lever 140 is maintained at a position isolated from the core metal end 113*a* of the driven roller 113 and the core metal portion 112*a* of the drive roller 112 between those.

For sake of the simplicity, FIG. 11 shows only the releasing lever 140 and the solenoid 142 on one side, but the releasing lever 140 and the solenoid 142 are disposed as a pair on each side of the driven roller 113 and the drive roller 112, and are structured to operate in synchrony with each other.

FIG. 12 is a diagram showing a relation between the drive roller 112 and the driven roller 113 when the solenoid is powered. If the solenoid 142 is powered where the rocking arm 118 is placed at the first position to which the recording medium P is fed as shown in FIG. 12, the releasing lever 140 pivotally moves around the lever shaft 141 as a center in the clockwise direction in FIG. 12, and pushes up the core metal end 113 on each side of the drive roller 113 in FIG. 12, thereby isolating the driven roller 113 from the drive roller 112.

Where the recording medium P is conveyed intermittently during recording operation at a recording section 105 locate on an upstream side in the conveyance direction of the recording medium P with respect to the drive roller 112 and the driven roller 113 serving as the rotary body pair, the recording medium P can be conveyed without receiving external disturbances to the conveyance accuracy of the recording medium P as far as the drive roller 112 is isolated from the driven roller 113, and thereby the apparatus can maintain the recording image with a high quality.

A delivery tray 114 disposed on a downstream side of the recording medium conveyance apparatus 117 is formed toward a lower direction outside the apparatus from the vicinity of the movable range of the drive roller 112 and the driven roller 113, and the delivery tray 114 stacks and contains the recording media P delivered out of the apparatus body by the drive roller 112 and the driven roller 113 after the recording operation of the recording media of other kinds having property not suitable for passing the fixing unit 115.

That is, the rocking arm 118 serving as a moving means selectively switches the position of the drive roller 112 and the driven roller 113 as the rotary body pair according the property of the recording medium P, thereby conveying the recording media P of the kinds having property requiring passage through the fixing unit 115 to the fixing unit 115, and delivering the recording media P of other kinds having property not requiring passage through the fixing unit 115 to the delivery tray 114.

FIG. 15 is a flow chart showing operation steps including the recording operation and the delivery operation. In FIG. 15, at step S1, an initial setting is made to clamp the recording medium P by means of the pulling-up roller pair 103. the buffer roller pair 104, the sub-scanning roller 106, and the pinch roller 107, thereby conveying the front end of the recording medium P at a prescribed position on the platen 109 of the recording section 105.

At that time, the driven roller 113 and the rocking arm 118 of the recording medium conveying apparatus 117 are held at the first position to which the recording medium P is fed.

At step S2, the apparatus waits for the recording operation instruction, and upon an instruction, the apparatus shifts to step S3. At step S3, the recording operation is executed at the recording section 105. The recording medium P is intermittently conveyed as formed with images of a predetermined width, and is fed into the recording medium conveying apparatus 117.

At that time, the drive gear 135 is rotatively driven by rotational drive force transmitted from the drive means not shown, thereby rotatively driving roller 112 in a direction that the recording medium P is conveyed. Simultaneously, the solenoid 142 is powered to push the core metal end 113*a* of the driven roller 113 upward by the releasing lever 140, thereby isolating the driven roller 113 from the drive roller 112. Moreover, the heating fixing roller pair 101 of the recording section 115 starts rotating.

The front end of the recording medium P passes through a space between the drive roller 112 and the driven roller 113 and proceeds on the left side in FIG. 13. Although the drive roller 112 rotates in a direction conveying the recording medium P, the front end of the recording medium P easily enters in the gap between the rollers by the rotation of the drive roller 112 because the driven roller 113 is separated, so that unnecessary conveyance force is not added during the recording operation, and so that the recording images can be produced with a high quality.

Step S4 is an operation after images for one page are recorded, and the recording medium P is conveyed so that a portion for the rear end of the single sheet reaches the cutter 111. At step S5. the drive gear 135 stops to stop the rotation of the drive roller 112.

At step S6, the controller stops powering the solenoid 142 to pivotally move the releasing lever 140 in the counterclockwise direction in FIG. 13 around the lever shaft 141 as a center to render the driven roller 113 in pressurized contact with the drive roller 112, thereby immobilizing the recording medium P upon clamping the recording medium P with the driven roller 113 and the drive roller 112.

The recording medium P is cut by the cutter 111 at step S7. At step S8, the drive gear 135 is driven rotatively in a prescribed amount, and the recording medium P is stopped after the rear end of the recording medium P cut by the cutter 111 is pulled in the recording medium conveying apparatus 117 by a prescribed amount up to the vicinity of the nip portion between the drive roller 112 and the driven roller 113.

At step S9, the rocking drive gear 124 starts rotating, and the rocking arm 118 is rocked in the counterclockwise direction in FIG. 14 around the rocking center shaft 119 as a center. When the rocking arm 118 rocks. the roller supporter 118 starts pivotal moving in the counterclockwise direction in FIG. 14 around the boss portion 127 as a center by operation of the pivotally moving sector gear 138.

When the rocking arm 118 transits to the second position as shown in FIG. 14, drive of the rocking drive gear 124 is stopped to stop the rocking arm 118. At that time, the tangent direction at the roller peripheral surface at the nip portion between the drive roller 112 and the driven roller 113 is substantially vertical direction as shown in FIG. 14.

At step S10, the drive gear 135 starts reverse rotation. The drive roller 112 and the driven roller 113 convey the recording medium P in a reverse rotation to the fixing unit 115 located at an upper portion in FIG. 14. At step S11, the recording medium P is conveyed by the drive roller 112 and the driven roller 113 until the front end of the recording medium P comes to be held by the heating fixing roller pair 101 of the fixing unit 115.

At step S12. when the front end of the recording medium P comes to be held by the heating fixing roller pair 101 of the fixing unit 115, the drive gear 135 is stopped from rotating reversely, thereby stopping the reverse rotation of the drive roller 112. The drive of the heating fixing roller pair 101 is continued until the rear end of the recording medium P passes through the fixing unit 115 at step S13.

At step S14, the rear end of the recording medium P during fixing is judged as to whether passing the nip portion between the drive roller 112 and the driven roller 113 on a time basis. At step S15, the rocking drive gear 124 drives rotating to rotatively drive the rocking arm 118 in the clockwise direction in FIG. 13 around the rocking center shaft 119 as a center, thereby returning to the first position.

The roller supporter 118 pivotally moves in the clockwise direction in FIG. 13 around the boss portion 127 as a center by operation of the pivotally moving sector gear 138 and returns to the initial first position. step S16, after completion of fixing on the recording medium P is confirmed, the controller stops the rotary drive of the heating fixing roller pair 101. thereby finishing the recording operation of this series.

In this embodiment, even where a recording medium P not requiring the fixing processing is used, the recording medium P can be delivery immediately out of the apparatus after image recording operation without fixing processing at the fixing unit 115 with the apparatus structure as described above.

FIG. 16 is a flow chart when the recording operation is executed with respect to the recording medium P not requiring the fixing processing. In this embodiment, a recording medium P not requiring the fixing processing is set to the apparatus body. Steps between step S21 and step S27 other than that no drive is made on the heating Shying roller pair 101 at step S23 are the same steps of steps S1 to S7.

At step S28, the drive gear 135 is driven in a certain amount to rotate the drive roller 112, and the recording medium P is conveyed until the rear end of the recording medium P cut by the cutter 111 passes through the nip portion between the drive roller 112 and the driven roller 113 and is separated.

At step S29, the recording medium P is judged as to whether passing the nip portion between the drive roller 112 and the driven roller 113 and being delivered out of the apparatus body on a time basis. At step S30, the drive of the drive roller 112 is stopped upon confirmation of the delivery of the recording medium P. The recording medium P at that time is stacked on the delivery tray 114 in passing through the nip portion between the drive roller 112 and the driven roller 113. At step S31, the post-processing operations are executed at the respective sections, and the recording operations of this series end, According to the above structure, the drive roller 112 and the driven roller 113 serving as the rotary body pair conveys the recording medium P in immobilizing the rear end side of the recording medium P fed to the recording medium conveying apparatus, so that the mechanism structure can be made simple without rendering the mechanical structure complicated because the functions can be acquired by the drive roller 112 and the driven roller 113 serving as the rotary body pair even where the conveyance length of the recording medium 113 to be sent is changed.

The conveyance direction of the recording medium P by itself can be changed without affecting the images during recording, so that selective switching of the delivery direction can be realized easily. Paper jamming is easily recovered because the recording medium P is restricted only by the rotary body pair of a one pair even where conveyance failure occurs.

Fifth Embodiment

Figure 17:
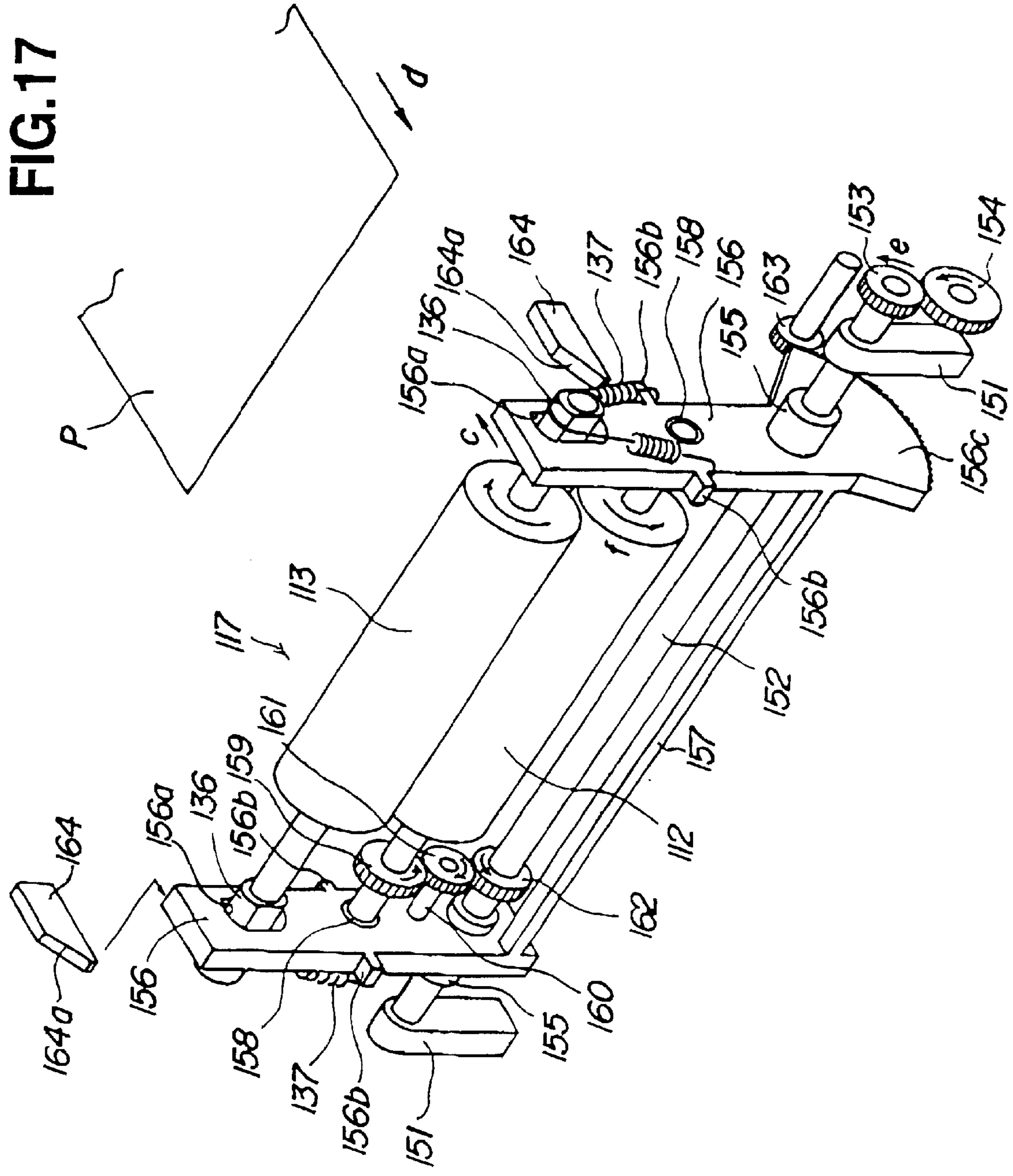
FIG. 17 is a perspective illustration showing a structure of a recording medium conveying apparatus according to the fifth embodiment of the invention.
Figure 18:
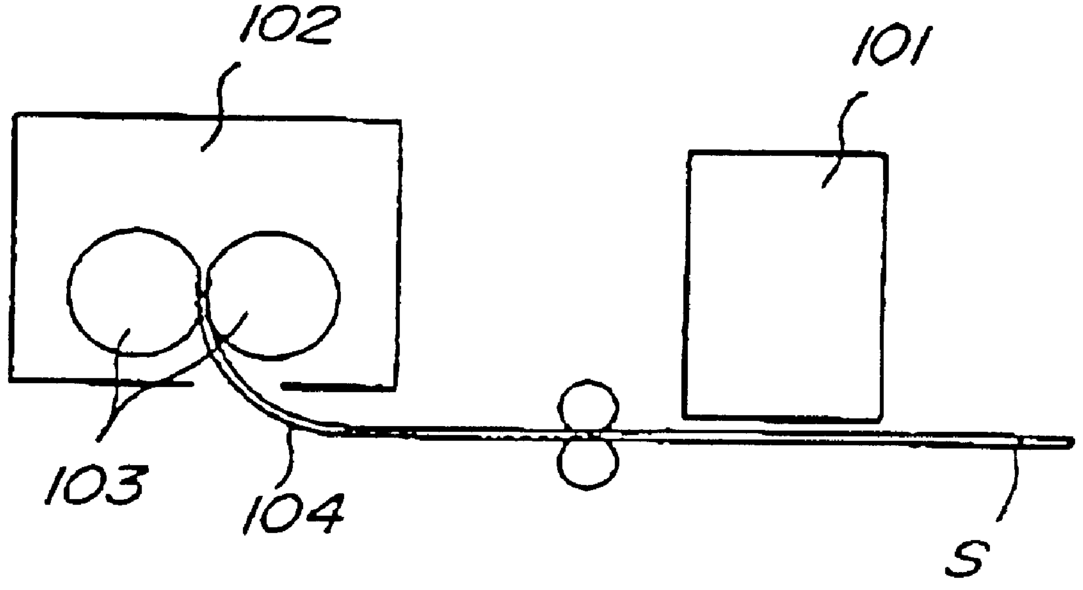
FIG.18 (prior art)
FIG. 18 is a diagram showing a printing section and a fixing section of a conventional printer.
Figure 19:
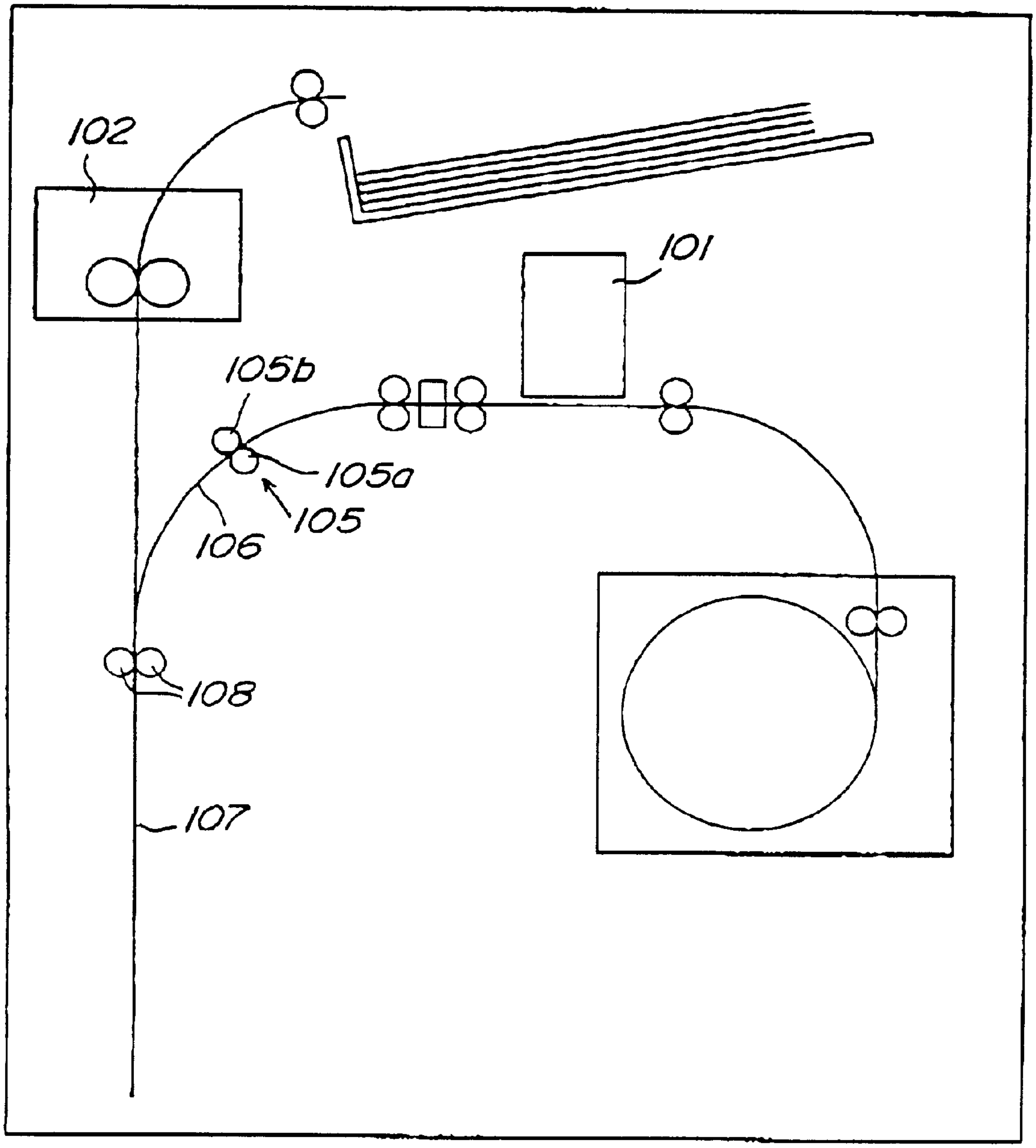
FIG.19 (prior art)
FIG. 19 is a diagram showing a schematic structure of another conventional printer.

Referring to FIG. 17, a structure of the fifth embodiment of a recording medium conveying apparatus according to the invention is described next. FIG. 17 is a perspective view showing a structure of the fifth embodiment of the recording medium conveying apparatus according to the invention. It is to be noted that the same reference numbers are given to the structure equivalent to those in the first embodiment, and a description of the equivalent structure is omitted.

In FIG. 17, a rotary shaft 152 is supported rotatably on a pair of bearings 151 disposed at each stable position of the apparatus body. A gear 153 is unitedly secured to one end of the rotary shaft 152, and engages with a drive gear 154 providing a rotary drive force transmitted from a drive means, not shown.

Rocking arms 156 of a pair are pivotally held on the rotary shaft 152 via respective boss portions 155, and the one ends of the rocking arms 156 of the pair are coupled with a connection frame 157. This structure allows the pair of the rocking arms 156 moving pivotally as a united body around the rotary shaft 152 as a center.

A drive roller 112 is supported rotatably to the pair of the rocking arms 156 through a bearing 158. A roller gear 159 is secured unitedly to one end of the drive roller 112. and a relaying gear 161 rotatably supported to a gear shaft 160 secured to the rocking arm 156 is engaged with the roller gear 159.

A coupling gear 162 secured to the rotary shaft 152 is engaged with the relaying gear 161, so that according to rotation of the drive gear 154, the drive roller 112 is rotatively driven by way of the gear 153, the rotary shaft 152, the coupling gear 162, the relaying gear 161, and the roller gear 159.

The driven roller 113 is supported rotatably by a bearing 136, and the bearing 136 is supported as fitted in a bearing long hole **156*a* formed at an upper portion in FIG. 17 of the rocking arm 156. A pressing spring 137 is suspended whose respective ends are engaged with engagement portions 156*b* of the rocking arms 156, respectively, on a side of the bearing 136 on each outer side of the rocking arm 156, thereby giving an urging force for pressing the driven roller 113 to the drive roller 112, A sector gear 156*c* is secured to each one end of the pair of the rocking arms 156, and the rocking drive gear 163 is engaged with the sector gear 156*c*, A rotation drive force is transmitted to the rocking drive gear 162 from the drive means, not shown, and a rocking force around the boss portion 155 is given to the rocking arm 156 via the sector gear 156*c***.

Isolation cams 164 of a pair are disposed at secured positions of the apparatus body. where the rocking arm 156 rocks in arrow c direction in FIG. 17 (the clockwise direction) from the rocking portion shown in FIG. 17 around the boss portion 155 as a center, a cam slope **164*a* of the isolation cam 164 engages with the lower surface of the bearing 136 and pushes the bearing 136 upward in FIG. 17 in opposition to the pulling force of the pressing spring 137, thereby moving the bearing 136 along the bearing long hole 156*a* to isolate the driven roller 113 from the drive roller 112**.

It is to be noted that the other recording section 105. the cutter 111, the delivery tray 114, the fixing unit 115, and the like are structured in the same way as those in the fourth embodiment. The operation steps with this structure are described below in detail. While images are recorded at the recording section 105, not shown, disposed on a right side in FIG. 17, the rocking arm 156 takes the first portion, at which the recording medium P is fed, slightly rocked in arrow c direction in FIG. 17 from a position shown in FIG. 17, and the driven roller 113 is isolated from the drive roller 112 by the isolation cam 164.

When the recording medium P is conveyed from the recording section 105 in arrow d direction in FIG. 17, the front end of the recording medium P is inserted in a gap between the drive roller 112 and the driven roller 113. The recording media P are fed to the gap between the drive roller 112 and the driven roller 113 in an intermittent feeding manner until the recording operation ends.

When one page recording finishes, the rocking drive gear 63 rotates in a prescribed amount to rock the rocking arm 156 by the prescribed amount in a direction reverse to arrow c direction in FIG. 17, or the counterclockwise direction. The isolation cam 164 is disengaged from the bearing 136 at that time, and the driven roller 113 moves in a direction for pressing the drive roller 112 by the pressing spring 137, so that the drive roller 112 and the driven roller 113 come to hold the recording medium P.

With the recording medium P, the rear end in the entering direction is cut in substantially the same war as in the fourth embodiment, The gear 153 meshing the drive gear 154 to which a rotation drive force is transmitted from the drive means, not shown, rotates in arrow e direction in FIG. 17, or the counterclockwise direction, thereby rotating the drive roller 112. The recording medium P is conveyed in a prescribed amount in arrow d direction in FIG. 17 and is pulled in the recording medium conveying apparatus 117.

The recording medium P on the upstream side in the conveyance direction with respect to the position of the cutter 111 is returned to the recording section 105 for the subsequent recording operation. Then, the rocking drive gear 163 rotates to pivotally move the sector gear **156*c*, and the rocking arm 156 is rocked in a direction reverse to arrow c direction in FIG. 17**, or the counterclockwise direction.

When the rocking arm 156 transits to the second position at which the rocking arm 156 extends horizontally, the rocking drive of the rocking arm 156 is stopped, and the rocking arm 156 keeps the position by electrically holding the drive shaft of a motor, not shown, for driving the rocking drive gear 163.

At that time, the drive roller 112 and the driven roller 113 are in a position relation that those rollers are arranged substantially horizontally, and the surface of the recording medium F held by the drive roller 112 and the driven roller 113 takes a position extending upright.

Subsequently, where the drive gear 154 rotates reversely, the drive roller 112 rotates in a direction reverse to arrow f direction in FIG. 17, or the clockwise direction, thereby conveying the recording medium P vertically upward. The fixing unit 115 is disposed at an upper portion in FIG. 17 in the same way as in the fourth embodiment, and the conveyance continues as the fixing operation goes on at the fixing unit 115.

The drive of the drive roller 112 is stopped at a time that the rear end of the recording medium P, which is being subject to fixing operation, passes by the nip portion between the drive roller 112 and the driven roller 113, and the rocking drive gear 163 is reversed to rock the rocking arm 156 in arrow c direction in FIG. 17, or the clockwise direction, and to return to the first position, thereby rendering the apparatus waiting for the next recording operation.

In this embodiment, upon controlling the rotary amount of the rocking drive gear 163, a third portion, other than the first and second portions, may be set to select another delivery direction. That is, the apparatus can be structured to properly select some delivery direction corresponding to the various objects by moving the mechanism to other plural positions. Such other structures can be formed in substantially the same way as those in fourth embodiment, and substantially the same advantages can be obtained.

In the above respective embodiments, the fixing means of the fixing unit 115 is not limited to a method made of a pair of heating fixing roller pair 101 as described above, such a fixing can be made by preparing in advance a transfer film in which a hot melt type latex layer is coated on a heat-resisting thermally conductive film as a base, heating the transfer film with a heating roller, and pressing the post-recorded recording medium P to transfer the latex layer onto the surface layer of the recording surface of the recording medium P and to protect the recording medium P with the latex layer to ensure the waterproof and weatherproof property of the recorded images.

With the above embodiments, switching between the recording operation not making the fixing processing as shown in FIG. 16 and the recording operation making the fixing processing as shown in FIG. 15 can be made by a switch controlled by a user, or can be switched by a signal from a computer for feeding recording instructions and image information to the recording apparatus.

Furthermore, a sensor for detecting the material of the recording medium passing the conveyance route or in the cassette may be arranged, and switching can be controlled based on the detection signal from the sensor.

As a form of the inkjet recording apparatus as described above, in addition to used as an image output terminal apparatus for information processing apparatus such as a computer or the like, the apparatus can be a photocopier in combination with a reader, a facsimile machine having a transmission and reception function, and so on.

As the recording means as described above, an inkjet recording method is described as an example, but this invention is not limited to the inkjet recording method as the recording method. This invention is applicable to thermal transfer recording methods, thermal sensitive recording methods, impacting recording methods such as wire-dot recording methods, and other recording methods. The invention is not limited to the serial recording methods, and is applicable to so-called line recording methods.

This invention has the structure and advantages thus described, so that the simple structure allows the conveyance direction of the recording medium converting without affecting the recording image quality, and with this invention, provided are a recording medium conveying apparatus capable of selective switching the delivery direction of the recording medium easily, and a recording apparatus having this device.

That is, selective switching of the delivery direction of the recording medium can be made easily with the moving means by moving the rotary body pair clamping the recording medium from the first portion to which the recording medium is entered to the second position or other plural positions.

Moreover, where the sheet on which images are formed is conveyed in changing the direction to the 4 unit, the conveying rotary body and the driven rotary body are moved from the first position where the sheet is received from the image forming section to the second position where the sheet is sent in changing the direction to the fixing unit as the received sheet is clamped, so that a conveyance route having a large radius of curvature becomes unnecessary, and so that the apparatus can be made compact. Where the mechanism is moved from the first position to the second positions the conveyance rotary body or the drive rotary body can be returned to the first position while the first sheet is subject to fixing where the conveyance rotary body and the drive rotary body are moved separately, and this allows image forming with respect to the second sheet early, thereby improving the through-put.

What is claimed is:

1. An inkjet image forming apparatus for forming an image on a recording medium by using an inkjet recording head, comprising:

a rotary body pair adapted to hold the recording medium after the recording medium passes a position facing the inkjet recording head and to change position between a first position for conveying the recording medium from a first route to a second route and a second position for conveying the recording medium from the first route to a third route;

a thermally processing section disposed in a third route to pass the recording medium therethrough for thermally modifying the recording medium on which an image is formed by the inkjet recording head; and a moving mechanism which moves the rotary body pair to the second position in a case where the recording medium is conveyed for passing through the thermally processing section.

2. The inkjet image forming apparatus according to claim 1, further comprising a releasing mechanism to release holding of the recording medium by the rotary body pair, the releasing mechanism separating the rotary body pair from each other when the recording medium is conveyed from the first route to the second route.

3. The inkjet image forming apparatus according to claim 1, wherein the moving mechanism selectively switches the position of the rotary body pair according to property of the recording medium.

4. The inkjet image forming apparatus according to claim 1, wherein the moving mechanism is capable of moving the rotary body pair to a position other than the first and second positions.

5. The inkjet image apparatus according to claim 1, wherein, in a case that the recording medium is conveyed to the thermally processing section, the rotary body pair moves to the second position as holding the recording medium.

6. The inkjet image forming apparatus according to claim 1, wherein the rotary body pair rotates in reverse directions when the recording medium is conveyed to the second route at the first position and when the recording medium is conveyed to the third route at the second position.

7. The inkjet image forming apparatus according to claim 1, wherein the inkjet recording head discharges ink by utilizing thermal energy applied from an electrothermal converter.

8. An image forming apparatus for forming an image to a sheet by using a recording head, comprising: a fixing section for fixing on the sheet the image formed on the sheet;

a conveying section having a conveying rotary body and a driven rotary body in selectively pressurized contact with the conveying rotary body for rotating in a driven manner; and moving mechanism which selectively moves the conveying rotary body and the driven rotary body to a first position for receiving the sheet from a position at which the sheet faces the recording head and a second position for transferring the received sheet to the fixing section by changing a conveyance direction of the sheet.

9. The image forming apparatus according to claim 8, wherein the moving mechanism moves the conveying rotary body and the driven rotary body as the sheet is held in a case that the conveying rotary body and the driven rotary body are moved from the first position to the second position and separately moves the conveying rotary body and the driven rotary body in a case that the conveying rotary body and the driven rotary body are moved from the second position to the first position.

10. The image forming apparatus according to claim 8, further comprising locking mechanism which locks either one of the conveying rotary body and the driven rotary body when the conveying rotary body and the driven rotary body move to the second position and for releasing the locked state on either one of the conveying rotary body and the driven rotary body after the other of the conveying rotary body and the driven rotary body moves to the first position.

11. The image forming apparatus according to claim 8, wherein the moving mechanism moves the other of the conveying rotary body and the driven rotary body from the second position to the first position after at least a front end of the sheet is transferred to the fixing section and before the subsequent sheet enters in the first position.

12. The image forming apparatus according to claim 8, wherein the moving mechanism includes a first arm supported rotatably to an apparatus body for supporting rotatably either one of the conveying rotary body and the driven rotary body, a second arm whose one end is held pivotally to a pivotally moving shaft of the first arm, the second arm supporting rotatably the other of the conveying rotary body and the driven rotary body and being urged in a direction returning from the second position to the first position, and pivotally moving mechanism which pivotally moves the first arm.

13. The image forming apparatus according to claim 12, wherein the pivotally moving mechanism is constituted of a motor, and a gear portion transmitting drive of the motor to the pivotally moving shaft of the first arm.

14. The image forming apparatus according to claim 12, wherein the pivotally moving mechanism is constituted of a motor, a rotary body rotating by the motor, and a moving member for moving the first arm in a direction pivotally moving according to rotation of the rotary body, and further comprising a cam provided at the rotary body for pivotally moving the second arm.

15. The image forming apparatus according to claim 13, further comprising a driving mechanism for driving the conveying rotary body, which is structured to rotate the conveying rotary body in a predetermined direction even where the conveying rotary body is moved to either of the first position and the second position.

16. The image forming apparatus according to claim 15, wherein the driving mechanism rotates the conveying rotary body in one direction where the conveying rotary body is located at the first portion and in another direction where the conveying rotary body is located at the second portion.

17. The image forming apparatus according to claim 16, wherein the driving mechanism includes a gear series capable of changing the rotation direction of the conveying rotary body.

18. The image forming apparatus according to claim 15, wherein the driving mechanism includes drive transmitter moving together with the conveying rotary body when the conveying rotary body moves to the first position or the second position.

19. The image forming apparatus according to claim 8, wherein the conveying section conveys, when the sheet is not necessary to be conveyed to the fixing section, the sheet to a delivery section without moving to the second position after receiving the sheet at the first position.

20. The image forming apparatus according to claim 8, wherein the fixing section melts a coating layer coated on a surface of the sheet.

* * * * *

UNITED STATES PATENT AND TRADEMARK OFFICE
CERTIFICATE OF CORRECTION

PATENT NO. : 6,520,634 B2
DATED : February 18, 2003
INVENTOR(S) : Kenji Yoshinaga et al.

It is certified that error appears in the above-identified patent and that said Letters Patent is hereby corrected as shown below:

Column 1,
Line 11, "Ring" should read -- fixing --.

Column 3,
Line 38, "feeding." should read -- feeding --.

Column 4,
Line 66, "2a" should read -- 8a --.

Column 8,
Line 35, "sheet," should read -- sheet. --.

Column 11,
Line 15, "invention:" should read -- invention; --.

Column 12,
Line 25, "density" should read -- density. --.

Column 14,
Line 16, "12a round" should read -- 12 around --.

Column 15,
Line 2, "regardless" should read -- regardless of --.
Line 32, "125," should read -- 125. --.

Column 16,
Line 25, "powered." should read -- powered, --.

Column 18,
Line 39, "step S16," should read -- At step 16, --.
Line 55, "Shying" should read -- fixing --.

Column 19,
Line 6, "end," should read -- end. --.
Line 66, "112," should read -- 112. --.

UNITED STATES PATENT AND TRADEMARK OFFICE

CERTIFICATE OF CORRECTION

PATENT NO. : 6,520,634 B2 
DATED : February 18, 2003
INVENTOR(S) : Kenji Yoshinaga et al.

It is certified that error appears in the above-identified patent and that said Letters Patent is hereby corrected as shown below:

Column 20,
Line 3, "156c," should read -- 156c. --.
Line 47, "embodiment," should read -- embodiment. --.

Column 22,
Line 25, "positions" should read -- position, --.
Line 66, "image apparatus" should read -- image forming apparatus --.

Signed and Sealed this

Twenty-sixth Day of August, 2003

JAMES E. ROGAN
*Director of the United States Patent and Trademark Office*